US012241749B2

(12) United States Patent
Spielman et al.

(10) Patent No.: US 12,241,749 B2
(45) Date of Patent: Mar. 4, 2025

(54) TRANSITION OF NAVIGATION MODES FOR MULTI-MODAL TRANSPORTATION

(71) Applicant: Lyft, Inc., San Francisco, CA (US)

(72) Inventors: Charles Parker Spielman, San Francisco, CA (US); Mayank Gulati, San Francisco, CA (US); Assaf Haim Shalev, San Francisco, CA (US); Christine Mara Todorovich, San Francisco, CA (US); Mikhail Skobov, Seattle, WA (US)

(73) Assignee: Lyft, Inc., San Francisco, CA (US)

( * ) Notice: Subject to any disclaimer, the term of this patent is extended or adjusted under 35 U.S.C. 154(b) by 902 days.

(21) Appl. No.: 16/805,135

(22) Filed: Feb. 28, 2020

(65) Prior Publication Data

US 2021/0270617 A1 Sep. 2, 2021

(51) Int. Cl.
*G06Q 10/02* (2012.01)
*G01C 21/34* (2006.01)
*G01C 21/36* (2006.01)
*G06Q 50/40* (2024.01)
*H04W 4/021* (2018.01)
*H04W 4/024* (2018.01)
*H04W 4/40* (2018.01)

(52) U.S. Cl.
CPC ..... *G01C 21/3423* (2013.01); *G01C 21/3652* (2013.01); *G06Q 10/02* (2013.01); *G06Q 50/40* (2024.01); *H04W 4/021* (2013.01); *H04W 4/024* (2018.02)

(58) Field of Classification Search
CPC ............ G01C 21/3423; G01C 21/3652; G01C 21/3655; G06Q 10/02; G06Q 50/30; H04W 4/021; H04W 4/024; H04W 4/40

USPC .......................................................... 701/533
See application file for complete search history.

(56) References Cited

U.S. PATENT DOCUMENTS

| 5,835,881 | A | 11/1998 | Trovato et al. |
| 8,954,094 | B1* | 2/2015 | Mishra ................. H04W 4/024 455/456.3 |
| 9,791,291 | B1 | 10/2017 | Yamashita et al. |
| 10,182,316 | B1 | 1/2019 | Tu et al. |
| 10,423,899 | B2 | 9/2019 | Zhou |
| 10,543,844 | B2 | 1/2020 | Gordon et al. |
| 10,648,822 | B2* | 5/2020 | Newlin ................. G01C 21/20 |
| 10,746,557 | B1 | 8/2020 | Lambert et al. |

(Continued)

OTHER PUBLICATIONS

The Rideshare Guy, How To Use Uber Driver App—2018/2019 Training & Tutorial, Sep. 27, 2018, YouTube, https://www.youtube.com/watch?v=fvg5-vZDjsU (Year: 2018).*

(Continued)

*Primary Examiner* — Jelani A Smith
*Assistant Examiner* — George A Alcorn, III
(74) *Attorney, Agent, or Firm* — Keller Preece PLLC

(57) ABSTRACT

Systems and methods for improved transitioning and updating of navigations modes for multi-modal transportation routes are presented. A transportation route may be received that includes a first segment associated with a first modality and a second segment associated with a second modality. A first interface associated with the first modality may be displayed and a trigger event associated with the first segment may be detected. In response, a second interface may be displayed that is associated with the second modality.

20 Claims, 12 Drawing Sheets

(56) References Cited

U.S. PATENT DOCUMENTS

| | | | |
|---|---|---|---|
| 10,885,791 B2 | 1/2021 | Watanabe | |
| 10,999,719 B1 | 5/2021 | Kaplan et al. | |
| 11,074,542 B2 | 7/2021 | Munafo et al. | |
| 2004/0236498 A1 | 11/2004 | Le et al. | |
| 2005/0107993 A1 | 5/2005 | Cuthbert et al. | |
| 2012/0004841 A1* | 1/2012 | Schunder | G01C 21/3661 701/412 |
| 2014/0278071 A1 | 9/2014 | San Filippo et al. | |
| 2015/0233722 A1 | 8/2015 | Faaborg et al. | |
| 2015/0323340 A1* | 11/2015 | McGavran | G01C 21/20 701/428 |
| 2016/0069696 A1* | 3/2016 | Salowitz | G01C 21/3423 701/408 |
| 2016/0071399 A1 | 3/2016 | Altman et al. | |
| 2016/0216130 A1* | 7/2016 | Abramson | G01C 21/3423 |
| 2016/0298977 A1 | 10/2016 | Newlin et al. | |
| 2017/0370736 A1 | 12/2017 | Singh | |
| 2018/0156623 A1 | 6/2018 | West et al. | |
| 2018/0268370 A1 | 9/2018 | Fallah | |
| 2019/0178679 A1 | 6/2019 | Woolley | |
| 2019/0333063 A1* | 10/2019 | Lim | G06Q 20/4015 |
| 2019/0383622 A1* | 12/2019 | Isaacs | G06Q 10/02 |
| 2020/0005947 A1 | 1/2020 | Blanchard et al. | |
| 2020/0104761 A1* | 4/2020 | Aich | G06Q 20/322 |
| 2020/0111268 A1* | 4/2020 | Montague | G06Q 30/0645 |
| 2020/0132480 A1* | 4/2020 | Majima | G01C 21/3438 |
| 2020/0273333 A1* | 8/2020 | Elshenawy | G08G 1/096805 |
| 2021/0025721 A1* | 1/2021 | Kline | G01C 21/3423 |
| 2021/0041252 A1 | 2/2021 | Huang et al. | |
| 2021/0270617 A1 | 9/2021 | Spielman et al. | |
| 2021/0270631 A1 | 9/2021 | Spielman et al. | |
| 2022/0236066 A1 | 7/2022 | Davies et al. | |

OTHER PUBLICATIONS

Your Driver Mike, Uber Express POOL Guide (2018), Jun. 19, 2018, YouTube, https://www.youtube.com/watch?v=KgnVW18DAi4 (Year: 2018).*

U.S. Appl. No. 16/805,113, filed Jun. 13, 2022, Notice of Allowance.

U.S. Appl. No. 16/805,113, filed Aug. 2, 2021, Office Action.

U.S. Appl. No. 16/805,113, filed Feb. 8, 2022, Office Action.

Fang, Zhihan, MAC: Measuring the Impacts of Anomalies on Travel Time of Multiple Transportation Systems, Proc. ACM Interact. Mob. Wearable Ubiquitous Technol. 3, 2, Article 42 (Jun. 2019), 24 pages. https://doi.org/10.1145/3328913 (hereinafter "Fang").

Espinosa et al., Generating traffic flow and speed regional model data using internet GPS vehicle records, Methods X vol. 6, 2019, pp. 2065-2075 (hereinafter "Espinosa").

Fang, Zhihan, MAC: Measuring the Impacts of Anomalies on Travel Time of Multiple Transportation Systems, Proc. ACM Interact. Mob. Wearable Ubiquitous Technol. 3, 2, Article 42 (Jun. 2019), 24 pages. https://doi.org/10.1145/3328913 (hereinafter "Fang"). ( abstract only).

U.S. Appl. No. 17/938,737, filed May 25, 2023, Office Action.

U.S. Appl. No. 17/938,737, filed Dec. 5, 2023, Office Action.

U.S. Appl. No. 17/938,737, filed Apr. 23, 2024, Office Action.

U.S. Appl. No. 17/938,737, mailed Oct. 16, 2024, Office Action.

* cited by examiner

TRANSITION OF NAVIGATION MODES FOR MULTI-MODAL TRANSPORTATION

BACKGROUND

Individuals desiring transportation (e.g., transportation by vehicle) between locations can submit transportation requests to transportation providers. In particular, users may submit transportation requests that identify specific locations between which transportation is desired and/or specific types of vehicles desired for use in provided transportation. In response, users may receive and follow transportation routes between the identified locations.

SUMMARY

The present disclosure presents new and innovative systems and methods for transitioning and updating navigations modes for multi-modal transportation routes. In a first aspect, a system is provided that includes a processor and a memory. The memory may store instructions which, when executed by the processor, cause the processor to receive a transportation route including at least a first segment associated with a first modality and a second segment associated with a second modality. The memory may store further instructions which, when executed by the processor, cause the processor to display a first interface associated with the first modality, detect a trigger event associated with the first segment, and display a second interface associated with the second modality.

In a second aspect according to the first aspect, the first interface displays first guidance information associated with the first modality and the second interface displays second guidance information associated with the second modality. The first guidance information may differ at least in part from the second guidance information.

In a third aspect according to any of the first and second aspects, the system is implemented at least in part by a computing device and the at least one of first and second guidance information includes haptic feedback presented via haptic actuators located in at least one of (i) the computing device and (ii) a vehicle associated with the first or second modality.

In a fourth aspect according to the third aspect, the haptic feedback is generated to provide navigation directions along at least one of the first segment and the second segment.

In a fifth aspect according to any of the first through fourth aspects, at least one of the first and second modalities is a vehicle selected from the group consisting of bicycles and scooter. The trigger event may include receiving an indication that at least one of (i) the vehicle was removed from a dock station, (ii) a lock associated with the vehicle was unlocked, (iii) the vehicle was deposited at a dock station, and (iv) the lock associated with the vehicle was locked.

In a sixth aspect according to any of the first through fifth aspects, the second modality is transportation by a vehicle selected from the group consisting of buses, trains, and ferries. The trigger event includes receiving an indication that payment was processed from a payment system associated with the vehicle.

In a seventh aspect according to any of the first through sixth aspects, the first modality is transportation by automobile. The trigger event may include receiving an indication from a computing device associated with an operator of the automobile that the first segment is complete.

In an eighth aspect according to any of the first through seventh aspects, the system is implemented at least in part by a computing device and wherein the trigger event is determined at least in part based on information detected by one or more sensors of the computing device.

In a ninth aspect according to the eighth aspect, the trigger event includes one or more of (i) detecting that the computing device has entered or exited a geofence, (ii) detecting a change in cellular connectivity for the computing device, (iii) detecting a telematics pattern indicative of the second modality, (iv) detecting a change in altitude with a pressure sensor of the computing device.

In a tenth aspect, a system is provided that includes a processor and a memory. The memory may store instructions which, when executed by the processor, cause the processor to receive a transportation route including at least a first segment and a second segment and display, on the computing device, a first interface including a visual indicator associated with a rate of progress of the computing device along the first segment. The memory may store further instructions which, when executed by the processor, cause the processor to determine, based on the rate of progress, a predicted travel time from a current location of the computing device to a starting location of the second segment and update the visual indicator based on a difference between the predicted travel time and a start time of the second segment.

In an eleventh aspect according to the tenth aspect, the visual indicator includes a representation of a remaining time until at least one of (i) the first segment is completed and (ii) the start time of the second segment.

In a twelfth aspect according to any of the tenth and eleventh aspects, the second segment is identified based on the start time.

In a thirteenth aspect according to any of the tenth through twelfth aspects, the memory stores further instructions which, when executed by the processor, cause the processor to determine that the predicted travel time exceeds the start time by more than a predetermined route update threshold and display, on the computing device, a first prompt to update the transportation route.

In a fourteenth aspect according to any of the tenth through thirteenth aspects, the memory stores further instructions which, when executed by the processor, cause the processor to display, in response to detecting a deviation of the computing device from the transportation route, a second prompt associated with a fraud event.

In a fifteenth aspect according to any of the tenth through fourteenth aspects, updating the visual indicator includes at least one of (i) updating the visual indicator to depict a first indication of a fast rate of progress if the predicted travel time exceeds the start time by a predetermined progress threshold, (ii) updating the visual indicator to depict a second indication of a medium rate of progress if the predicted travel time exceeds the start time by less than the predetermined progress threshold, and (iii) updating the visual indicator to depict a third indication of a slow rate of progress if the predicted travel time is less than or equal to the start time.

In a sixteenth aspect according the fifteenth aspect, at least one of (i) the first indication depicts a running person, (ii) the second indication depicts a walking person, and (iii) the third indication depicts a skipping person.

In a seventeenth aspect according to any of the first through sixteenth aspects, the first segment is associated with a first modality, and the predicted travel time is determined by a model configured to generate an initial predicted time from the current location of the computing device to the starting location of the second segment and determine a first adjustment to the initial predicted time, the first adjustment at least partially based on previous movement speeds of a user associated with the computing device when using the first modality.

In an eighteenth aspect according to the seventeenth aspect, the model is configured to generate the initial predicted time based on the first modality, a distance from the current location of the computing device to the starting location of the second segment, and previous travel times for previously-completed trips using the first modality in locations near the current location of the computing device.

In a nineteenth aspect according to any of the tenth through eighteenth aspects, the predicted travel time includes a predicted transition time to begin the second segment.

In a twentieth aspect according to the nineteenth aspect, the second segment is associated with a second modality and wherein the predicted transition time is generated based at least in part on a time associated with accessing the second modality.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Aspects of the present disclosure involve systems and methods for responsively displaying guidance information. The guidance information may assist users in accessing and receiving transportation according to a transportation route. The transportation route may include multiple different transportation modalities.

Figure 1:
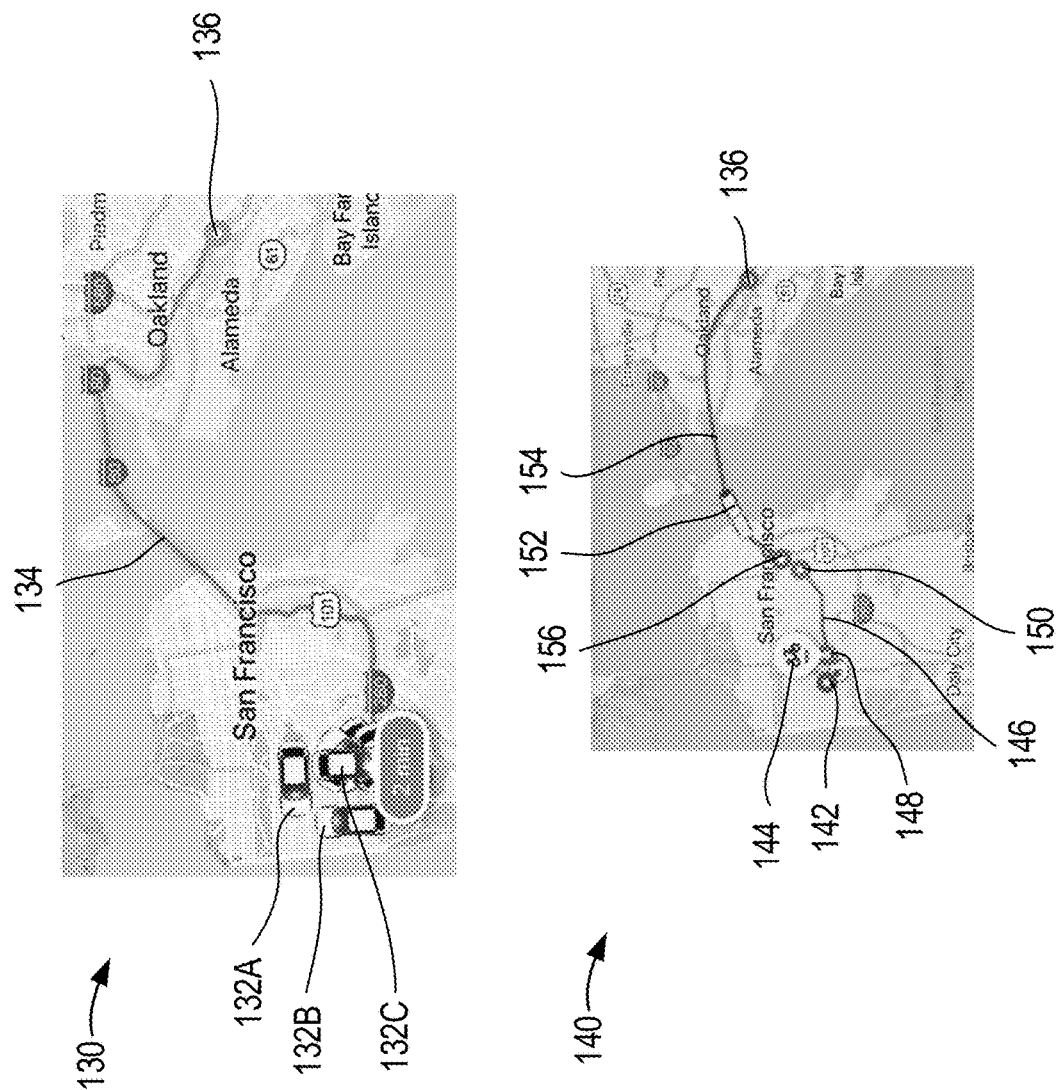
FIG. 1 illustrates transportation routes according to exemplary embodiments of the present disclosure.

Existing systems for providing transportation are typically configured to identify and provide a particular modality of transportation between starting and ending locations. For example, FIG. 1 depicts a transportation route 130 identifying a particular modality of transportation between a starting location (not labelled) and an ending location 136. The transportation route 130 includes a single transportation segment 134 between the starting location and the ending location 136. The transportation segment 134, as generated, is to be serviced by one of the cars 132A-C. For example, a user requesting transportation from the starting location to the ending location 136 may be picked up by one of the cars 132A-C and driven along the route indicated by the transportation segment 134 to the ending location 136.

In certain implementations, systems may analyze and/or recommend transportation routes using modalities other than cars. For example, where the starting location and ending location 136 are closer together (e.g., shorter rides), the transportation matching system may generate transportation routes that utilize a personal mobility vehicle (e.g., a bicycle or a scooter). As another example, a system may determine that a given starting location and/or ending location 136 are near transit stops for public transportation systems. In such a scenario, the transportation matching system may generate a transportation route from the starting location that utilizes a public transportation modality (e.g., a bus or a train).

Typical systems for providing transportation, however, may not be able to generate transportation routes that combine multiple modalities into a single transportation proposal. Therefore, such transportation matching systems cannot capture cost or time savings associated with combining multiple modalities into a single transportation proposal. For example, in certain instances (e.g., during rush hour traffic), car-based modalities may be comparatively slower than other modalities, such as bicycles or scooters. As another example, during rush hour or periods of high road congestion, it may be faster to take the train (i.e., use a public transit modality) between the two locations rather than to drive (i.e., use an automobile modality) between the two locations. In such a scenario, existing systems may recommend public transportation modalities between starting and ending locations for users located near transit stops. But such a recommendation may not be useful for all users. For instance, users that are not in close proximity to a transit stop may have to walk long distances over a significant amount of time to access the transit stop from their starting location. Alternatively, such users may have to walk long distances over a significant amount of time to leave a transit stop and arrive at their ending location. In either scenario, using public transportation may be slower than traveling by car. Such users may therefore be recommended transportation routes using cars, such as the cars 132A-C.

Nevertheless, even users located far away from public transportation may receive faster transportation if they were able to use other modalities for transportation to the transit stops. For example, FIG. 1 also depicts a transportation route 140 for transportation between starting location 142, which corresponds to the starting location of the transportation route 130, and ending location 136. Rather than fulfilling the entire transportation route 140 with a single modality as in the transportation route 130, the transportation route 140 includes two transportation segments 146, 154 fulfilled by two different modalities (e.g., two different types of vehicles 144, 152). In particular, transportation segment 146 is fulfilled by bicycle 144 and transportation segment 154 is fulfilled by train 152. While following the transportation route 140, a user may walk from starting location 142 to location 148 at the beginning of the transportation segment 146 and pick up a bicycle 144 (e.g., a docked or dockless bicycle available for short term rental and/or use). The user can then ride the bicycle 144 from the location 148 to the location 150 at the end of the transportation segment 146 and drop off the bicycle 144 (e.g., at a bicycle dock or bicycle rack) before walking to location 156 at the start of segment 154. The location 156 may correspond to a transit station (e.g., a train station), and the user may board the train 152 for transportation to the ending location 136 at the end of the segment 154.

However, transportation routes that utilize multiple modalities may also come with drawbacks. For example, different modalities (e.g., different types of vehicles) may benefit from different levels of detail for displayed information, and it may increase visual clutter. For example, a user riding a scooter between two locations may benefit from more information (e.g., navigation directions along which to ride the scooter) than a user riding on a train, who may only want to know, e.g., which stop to get off the train and/or how many stops remain until they get off the train. Therefore, it may be advantageous to change the type and/or amount of information displayed to a user according to which type of modality the user is currently utilizing. However, in order to determine which information should be displayed, it may be necessary to determine on an ongoing basis which modality a user is utilizing, which presents technical challenges. In particular, it may be necessary to determine when a user transitions between two different modalities in order to change the amount of information displayed and/or to guide a user through the next steps in the transportation route. Furthermore, certain types of transportation (e.g., trains, buses, shared automobile rides) may only be available at particular times (e.g., according to a fixed schedule or a predicted availability). Therefore, it may be necessary to display information regarding the particular times so users can quickly determine when they need to arrive at a particular location (e.g., a transit stop).

One solution to these problems is to utilize different interfaces to display guidance information for different modalities. As a mobile device (e.g., a mobile device associated with a user) transitions between segments of a transportation route that utilizes different modalities, the displayed interface may update to an interface associated with modalities of the segments. Furthermore, the transitions may be automatically detected when trigger events occur between different modalities. Upon detecting a trigger event, it may be determined that the mobile device has transitioned from one segment to a later segment and the displayed interface may be updated to display guidance information associated with a modality of a later segment. Additionally, a travel time may be regularly predicted for the user to travel from their current location to a starting location of a later segment (e.g., a segment associated with a modality with predetermined availability times). A visual indicator may then be updated within the displayed interface based on a comparison of a predicted travel time to a starting time of the later segment.

Figure 2:
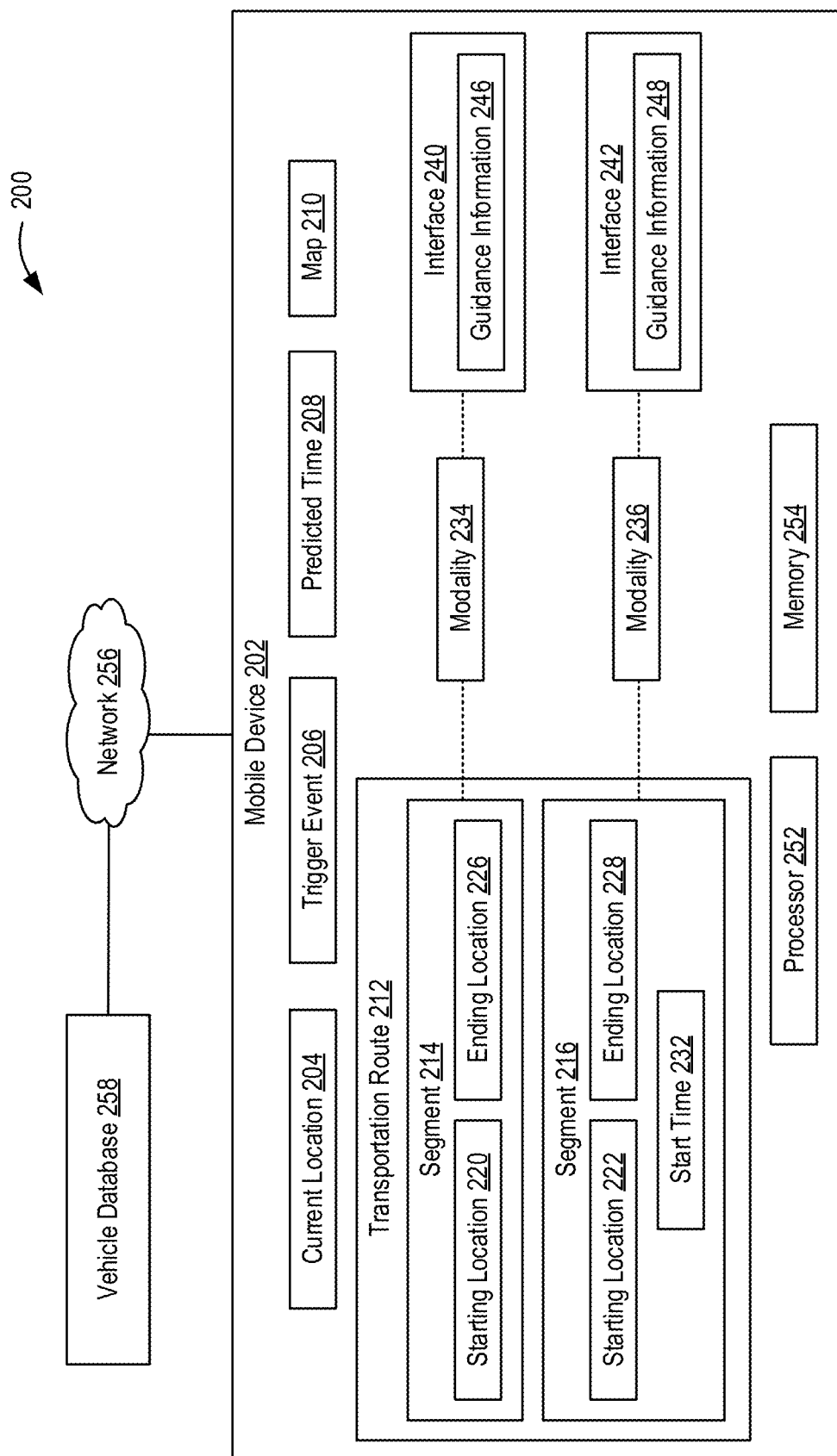
FIG. 2 illustrates a system for responsive display of transportation routes according to an exemplary embodiment of the present disclosure.

FIG. 2 illustrates a system 200 for responsive display of transportation routes according to an exemplary embodiment of the present disclosure. The system 200 may be configured to responsively display guidance information for users following multi-modal transportation routes. The system 200 includes a mobile device 202 communicatively coupled to a vehicle database 258 and a transit server 260 via a network 256. The mobile device 202 may be configured to display information relevant to transportation routes 212. For example, the mobile device 202 may be associated with a particular user who requested transportation. In response, the mobile device 202 may receive and/or generate a transportation route 212. The transportation route 212 may designate instructions for transporting the associated user to one or more specified destinations.

The transportation route 212 may include one or more segments 214, 216. The segments 214, 216 may specify portions of the transportation route 212. In particular, the segments 214, 216 may each include starting locations 220, 222 and/or ending locations 226, 228 and may correspond to portions of the transportation route 212 between the starting locations 220, 222 and the ending locations 226, 228. Each of the segments 214, 216 are associated with modalities 234, 236, which may specify particular types of transportation. For example, the modalities 234, 236 may correspond to one or more of transportation by automobile, transportation by autonomous automobile, transportation by bus, transportation by train, transportation by ferry, transportation by docked personal mobility vehicle (e.g., bicycle and/or scooter), transportation by dockless personal mobility vehicle, and transportation by walking. In certain implementations, the segments 214, 216 may be associated with different modalities 234, 236. For example, the segment 214 may be associated with a modality 234 of transportation by scooter and the segment 216 may be associated with a modality 236 of transportation by train.

Each modality 234, 236 may have an associated interface 240, 242, which may be displayed by the mobile device 202 (e.g., on a display of the mobile device 202). The interfaces 240, 242 may be configured to display information regarding segments 214, 216 that utilize each of the modalities 234, 236. For example, the interfaces 240, 242 may be configured to display guidance information 246, 248. The particular type and/or layout of guidance information 246, 248 displayed by the interfaces 240, 242 may differ. For example, the interfaces 240, 242 may be configured to display particular types of guidance information that are relevant to users receiving transportation from each of the modalities 234, 236. Exemplary interfaces are discussed in greater detail below in connection with FIGS. 3A, 3B, 4. Although not depicted, certain interfaces may be used by more than one type of modality. For example, bicycles and scooters may share similar interfaces and/or buses and trains may share the same or similar interfaces. In certain implementations, the mobile device 202 may also display a map 210, which may display an area surrounding the current location 204 and/or one or more of the starting locations 220, 222 and/or ending locations 226, 228. The map 210 may be displayed as part of the interfaces 240, 242.

The mobile device 202 may transition between the interfaces 240, 242 after determining that the segment 214 is complete and/or after determining that the segment 216 has begun. For example, the mobile device 202 may determine that a trigger event 206 has occurred indicating that the segment 214 is complete and/or that the segment 216 has begun. The trigger event 206 may be determined based on information received from one or more sensors of the mobile device 202 and/or based on information received by the mobile device 202 from one or more other computing devices. Specifics regarding the trigger events 206 are discussed further below in connection with the method 700.

Additionally, the segment 216 includes a start time 232, which may indicate a time at which the segment 216 is predicted to start. For example, the start time 232 may indicate a time at which the user must arrive at the starting location 222 of the segment 216 to receive transportation. As a specific example, where the segment 216 corresponds to transportation by train, the start time 232 may indicate an arrival and/or departure time of a train that can fulfill the segment 216 (e.g., a train on the correct train line). For other modalities 236, the start time 232 may represent one or more of an arrival time of a bus, a predicted arrival time of an automobile, a predicted time at which a bicycle or scooter becomes available. To ensure the segment can be properly fulfilled, the mobile device 202 may need to arrive at the starting location 222 at or before the start time 232 in order to access a vehicle corresponding to the modality 236.

The mobile device 202 may therefore be configured to predict whether a user will arrive at the starting location 222 at or before the start time 232. For example, the mobile device 202 may generate a predicted time 208 at which the mobile device 202 will arrive at the starting location 222. The predicted time 208 may be generated and/or updated. In particular, the predicted time 208 may specify a predicted travel time from a current location 204 of the mobile device 202 to the starting location 222 of the segment 216. The current location 204 may represent a current or most recent location of the mobile device 202 determined according to one or more of a Global Positioning System (GPS) sensor, a cellular signal-based (e.g., Global System for Mobiles (GSM)-based) location determination process, and/or any other type of location sensor. The mobile device 202 may determine the predicted time 208 based on previous travel times. For example, the mobile device 202 may include (or may access another computing device that includes) a predictive model. The predictive model may be trained to determine predicted times 208 based on transportation routes that have been previously-completed. The predictive model may also adjust predicted times based on one or more of (i) location-specific factors and (ii) user-specific factors. For example, the predicted time 208 may be predicted based on one or more of a predicted travel time to the starting location 222 and a predicted transition time required to access the modality 236. In certain implementations, one or both of the travel time and the transition time may be adjusted based on user-specific factors, such as typical travel speeds using particular modalities and/or typical transition times at the starting location 222 or similar locations. Predictive models that may be used to determine predicted times 208 are discussed in greater detail below in connection with FIG. 6.

The predicted time 208 may then be compared to the start time 232 to determine whether a user receiving transportation according to the transportation route 212 is likely to arrive at the starting location 222 at or before the start time 232. For example, the mobile device 202 may add the predicted time 208 to a current time and compare the result to the start time 232. If the result is later than the start time 232 by more than a predetermined threshold (e.g., a progress threshold), the mobile device 202 may determine that a probability of arriving at the starting location 222 before the start time 232 is low, or that a faster rate of progress is needed to arrive at the starting location 222 before the start time 232. Upon determining this, the mobile device 202 may update one or more visual indicators (e.g., visual indicators of the interfaces 240, 242). For example, the mobile device 202 may update the visual indicators to indicate that a faster rate of progress is required (e.g., when the mobile device 202 is currently associated with transportation by bicycle or scooter). If the result is earlier than or equal to the start time 232 (e.g. earlier by an amount of time greater than a predetermined threshold), the mobile device 202 may determine that the user is likely to arrive at the starting location 222 before the start time 232 and that a slower rate of progress may be acceptable to the starting location 222. After comparing the predicted time 208 to the start time 232, the mobile device 202 may update one or more visual indicators. For example, the mobile device 202 may update the visual indicators to indicate a slower rate of progress and/or to indicate that additional time remains between the predicted time 208 and the start time 232. In certain implementations, if the result is earlier than the start time 232 by less than a predetermined amount, the mobile device 202 may determine, based on the predicted time 208, that the mobile device 202 is likely to arrive at the starting location 222 at or before the start time 232, but does not have enough time to travel at a slower rate of progress. Therefore, the mobile device 202 may update one or more visual indicators to indicate that the current rate of progress should be maintained. The visual indicators are discussed in greater detail below in connection with FIGS. 5A-5D.

The transportation route 212 is depicted as containing two segments 214, 216. In practice, transportation routes 212 may include more or fewer segments 214, 216. For example, transportation routes 212 may be generated that include one segment, three segments, four segments, or more. Further, only one segment 216 is depicted as containing a start time 232. In practice, more than one segment 216 may have a start time 232. For example, a transportation route may be generated that includes four segments and the second and third segments may both include start times. In instances where more than one segment contains a start time, the mobile device 202 may determine a predicted time for each of the segments (e.g., a predicted time for arriving at the starting location of each of the segments) and may update visual indicators based on one or both of the segments. For example, if the user is predicted to arrive on time for the third segment but needs to travel at a faster rate of progress to arrive on time for the second segment, the visual indicators may be updated to indicate that the user needs to travel at a faster rate of progress.

The mobile device 202 may communicate with one or more additional computing devices in order to generate and display the interfaces 240, 242. For example, the vehicle database 258 may store information regarding the positions, status, and availability of different types of vehicles (e.g., automobiles, buses, scooters, bicycles, trains). For example, the vehicle database 258 may store information used to determine start times 232 (e.g., arrival times at particular buses/trains at different transit stops, predicted availability of bicycles/scooters). Additionally or alternatively, the mobile device 202 may access the vehicle database 258 to update the start time 232 of a segment 216. For example, if the mobile device 202 determines that the predicted time 208 is later than the start time 232 by more than a predetermined threshold (e.g., a route update threshold), the mobile device 202 may determine that the user will not arrive at the starting location time 222 at or before the start time 232, even if a faster rate of progress is achieved. In certain implementations, the route update threshold may be larger than the above-discussed progress threshold. Therefore, the mobile device 202 may update the start time 232 to a later time (e.g., a later arrival time of a train on the same train line and/or a bus on the same bus line). To do so, the mobile device 202 may access the vehicle database 258 to determine later arrival times for vehicles of the modality 236 (e.g., on the same train or bus line) and may select one of the later arrival times (e.g., a later arrival time that occurs after the predicted time 208) as the new start time 232. The mobile device 202 may communicate with the vehicle database 258 via a network 256. The network 256 may be accessed via one or more wired or wireless network interfaces and may include one or more networks, including one or more local networks and/or the Internet. In certain implementations, the vehicle database 258 may be optional. For example, the segment 216 may include additional start times other than the start time 232 and the mobile device 202 may select between the additional start times. In further implementations, the mobile device 202 may request another transportation route if it is determined that a user will not arrive at or before the start time 232.

The mobile device 202 also includes a processor 252 and a memory 254, which may implement one or more operational features of the mobile device 202. For example, the memory 254 may store instructions which, when executed by the processor, cause the processor to perform one or more operational features of the mobile device 202. Although not depicted, the vehicle database 258 may similarly include a processor and/or a memory configured to implement one or more operational features of the vehicle database. Additionally, although the mobile device 202 is described as a mobile device, in practice the mobile device 202 may additionally or alternatively be implemented as any type of computing device (e.g., a personal computer, a laptop, a smartphone, a tablet computing device, a wearable computing device) or any device including a processor.

Figure 3A:
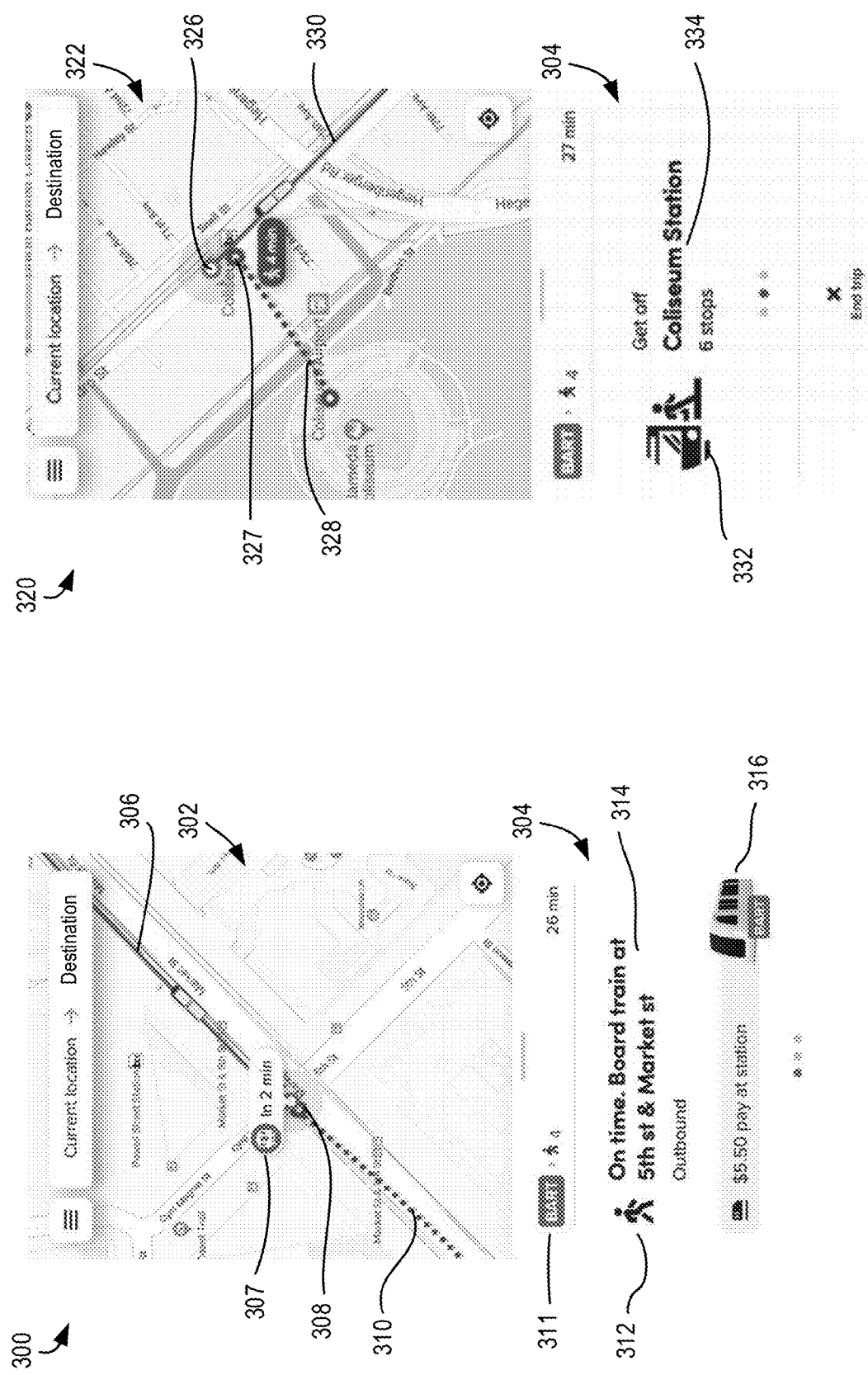
FIGS. 3A-3B illustrate interfaces for display of guidance information according to exemplary embodiments of the present disclosure.
Figure 3B:
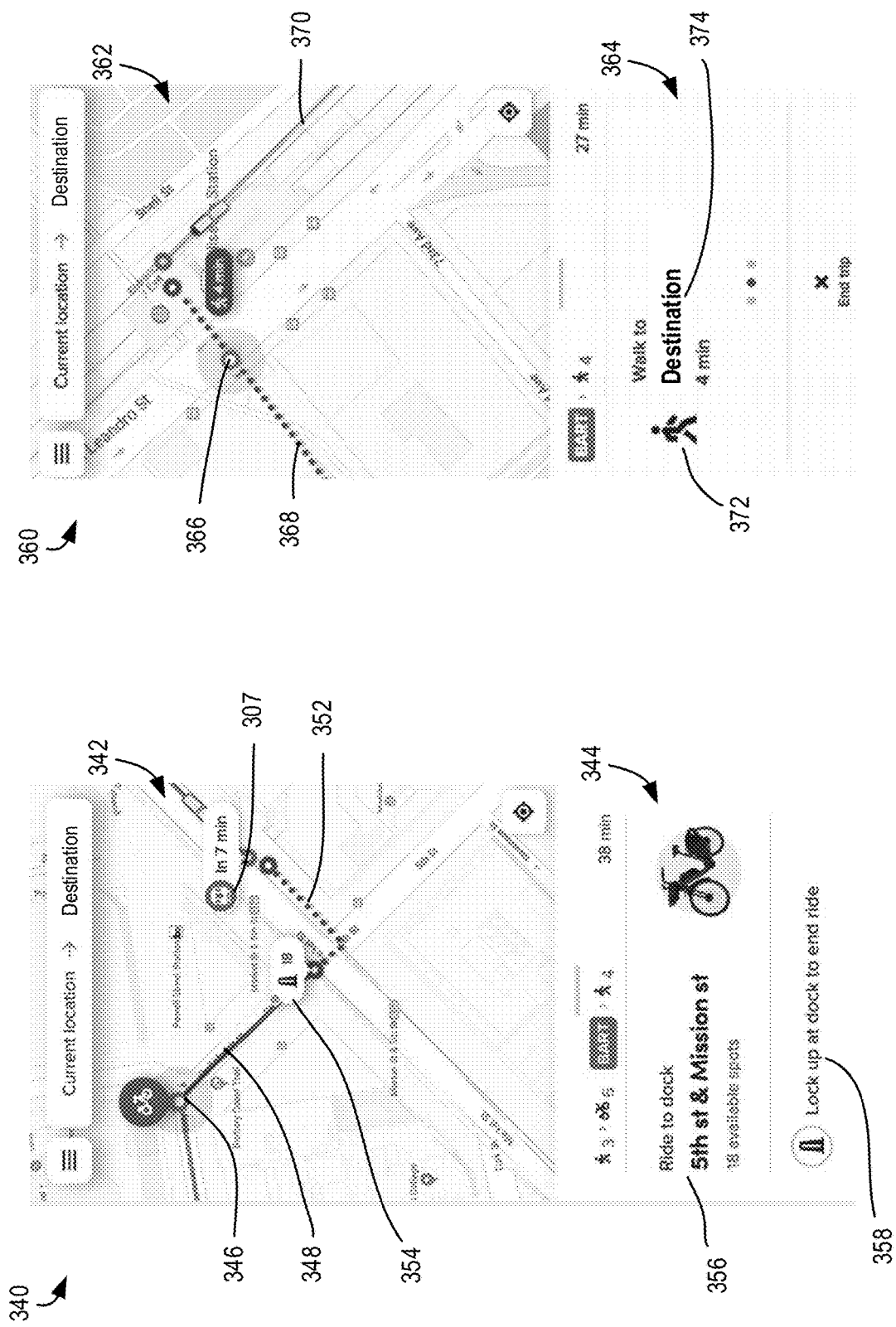

FIGS. 3A-3B illustrate interfaces 300, 320, 340, 360 for display of guidance information according to exemplary embodiments of the present disclosure. The interfaces 300, 320, 340, 360 may be exemplary implementations of the interfaces 240, 242. For example, the interfaces 300, 320 may be associated with transportation by train, the interface 340 may be associated with transportation by bicycle, and the interface 360 may be associated with transportation by walking.

The interface 300 includes a map 302 and a panel 304. The map 302 depicts an area surrounding a current location 308 (e.g., a current location of a mobile device displaying the interface 300). In particular, the map 302 may be generated to display contextually-relevant information. For example, the interface 300 may be displayed to a user after arriving at a transit stop (e.g., after walking to a transit stop) at which the user will board a train. In such instances, the map 302 may be generated to include indications of the current location 308, a location of the transit stop 307, and paths 306, 310 associated with segments of a current transportation route. For example, the path 310 may correspond to an earlier segment of the transportation route in which the user walked to the transit stop 307 and the path 306 may correspond to a segment where the user boards and rides a train (e.g., rides a train along the depicted path 306). As depicted, the paths 306, 310 may be depicted with different patterns. For example, the patterns used to depict the paths 306, 310 may be selected according to the modality of the segment corresponding to the paths 306, 310. For example, the path 310 is depicted with a dotted line, which may be selected because the path 310 corresponds to a segment associated with transportation by walking. As another example, the path 306 is depicted as a solid line, which may be selected because the path 306 corresponds to a segment associated with transportation by train. In certain implementations, the paths 306, 310 may be depicted in different colors, which may be selected according to the modality of the segment corresponding to the paths 306, 310. For example, the path 310 may be depicted in grey and the path 306 may be depicted in blue.

The panel 304 may display additional guidance information related to the transportation route. For example, the panel 304 includes a visual indicator 311 that depicts an overview of the transportation route. The visual indicator 311 may be updated as the user progresses along a transportation route to indicate remaining and/or upcoming portions of a transportation route. The panel 304 also includes a visual indicator 312 depicting a representation of a walking person. The visual indicator 312 may be updated as the user progresses through the transportation route. For example, a speed of animation and/or a type of animation for the visual indicator 312 may be updated to indicate whether a user needs to travel faster, e.g., to comply with a start time of a later segment. As a specific example, the visual indicator 312 depicts a representation of a walking person, which may indicate that the user does not need to travel faster. However, in other instances, the visual indicator 312 may be updated to depict a representation of a person running to indicate that the user needs to travel faster. In still further instances the visual indicator 312 may be updated to depict a representation of a skipping person to indicate that the user can travel slower if desired. Exemplary implementations of the visual indicators 311, 312 are discussed in greater detail below in connection with FIGS. 5A-5D.

The panel 304 also includes instructions 314, which may provide textual instructions for a user to follow. In particular, the instructions 314 may describe the next actions a user is to take in connection with following the transportation route. For example, in the depicted example, the user may have arrived at the transit stop 307 and the instructions 314 may indicate that the train is on time and that the user should board the train at the transit stop 307 (e.g., a transit stop located at 5th St. and Market St.). The instructions 314 may also include additional details 316, which may provide more detailed instructions. For example, the additional details 316 may indicate that, after arriving at the station, the user will have to pay $5.50. In certain implementations, the additional details 316 may provide further information. For example, at transit stops with multiple trains or multiple train platforms, the additional details 316 and/or instructions 314 may indicate the train line and/or train platforms. As a further example, for large transit stops, the additional details 316 may indicate instructions for navigating through the transit stops (e.g., to access a particular train and/or train platform, to purchase tickets and/or pay fares prior to boarding). In certain instances, the panel 304 may not initially display the additional details 316. For example, the additional details may initially be hidden below the bottom of the interface 300 and may only be visible after dragging the panel 304 up (e.g., to scroll the contents of the panel 304 and/or to expand a position of the panel 304). Additional details regarding such instances are discussed further below in connection with FIG. 4A.

In certain instances, the panel 304 may be generated to include multiple tabs or pages. Each of the tabs may include an instruction for following a segment of the transportation route. For example, for transportation by train, the panel 304 may include tabs depicting instructions for a user to board the train, ride the train (e.g., for a particular number of stops), and leave the train. As a specific example, the interface 320 may be a subsequent version of the interface 300 in which the panel 304 depicts instructions 334 for a user to leave the train after arriving at a particular station. The interface 320 may be displayed when the current location 326 of the mobile device displaying the interfaces 300, 320 is near (e.g., is less than a predetermined distance from) the transit stop at which the user is supposed to leave the train. In addition to different instructions, the interface 320 includes other guidance information, which is contextually different from the information in the interface 300. For example, the visual indicator 332 differs from the visual indicator 312 and includes a depiction of a person leaving a train. Also, the map 322 depicts indicators of the current location 326 and the transit stop 327 at which the user is supposed to leave the train. The map 322 also depicts paths 328, 330, which may correspond to portions of the transportation route, similar to the paths 306, 310. For example, the path 330 may correspond to the path followed by the user while riding the train and the path 328 may correspond to a path followed by the user while walking after disembarking the train. As with the paths 306, 310, the patterns used to display the paths 328, 330 may differ depending on the modality of the corresponding segment of the transportation route.

The interface 340 may be displayed when a user is receiving transportation by bicycle (e.g., is riding a bicycle). In particular, the user may be riding a docked bicycle that is accessed from and deposited at stations in particular locations. Although not depicted, similar techniques may likewise be utilized for users riding dockless bicycles (e.g., bicycles that do not need to be accessed from or deposited at stations in fixed locations). For example, the ending locations 226, 228 for segments 214, 216 associated with dockless vehicles (e.g., dockless bicycles and/or scooters) may identify recommended drop-off locations for the dockless vehicles. As a specific example, such ending locations 226, 228 may be selected based on previously-completed trips using dockless vehicles within a predetermined distances of the starting location 222 of the segment 216.

The interface 340 includes a map 342 and a panel 344. The map 342 depicts visual indications of the current location 346 of the mobile device displaying the interface 340 and of the locations of the dock 354 at which the bicycle the user is riding is to be deposited (or a recommended drop-off location for a dockless vehicle). The visual indicator of the dock 354 includes a numerical indicator of the number of spots available to receive bicycles (e.g., 18 spots), although alternative implementations may omit or utilize different indicators of spots available. In certain implementations, aspects of the map 342 may be updated based on subsequent segments of a trip. For example, the map 342 further includes a visual indicator of the transit stop 307 which the user may be going to ride the train (e.g., as discussed above in connection with the interfaces 300, 320). As a further example, the visual indicator of the transit stop 307 may be updated (as depicted) to include an estimated time of departure for vehicles (e.g., trains) from the transit stop 307.

The map 342 also includes paths 348, 352. The path 348 may depict the path the user should follow (e.g., to reach the dock 354) and the path 352 may depict the path the user should follow (e.g., to reach the transit stop 307). As discussed previously, the paths 348, 352 may be depicted with different colors and/or patterns to indicate which modality is used along each path 348, 352. In particular, as depicted the path 352 may be depicted as a dotted line to indicate that the user will walk along the path 352 and the path 348 may be depicted as a solid line to indicate that the user is riding a bicycle along the path 348. Further, to distinguish the path 348 from the paths 306, 330 that correspond to receiving transportation by train, the path 348 may be depicted in a particular, corresponding color, such as a pink or purple color (as compared to the blue color of the path 306, 330). In certain implementations, the map 342 may additionally include indications of other nearby docks at which the user's bicycle may be deposited and/or may include indications of which displayed roads include bike lanes.

The panel 344 depicts instructions 356, which may indicate steps necessary to access, ride, and deposit a bicycle. Although presented in a similar format, the information contained within the instructions 356 may differ from the information contained in other instructions 314, 334 for other modalities. For example, in addition to giving information on how to access and/or deposit a bicycle at docks 354 as depicted, at other times the instructions 356 may present specific directions (e.g. turn-by-turn directions) for the user to follow. In particular, certain modalities (e.g., bicycles, scooters, and walking) may require the user to navigate on their own instead of riding in another vehicle. In such instances, the users may require clearer instructions than other modalities, necessitating different guidance information 246, 248 than for other modalities (e.g., for trains or automobiles). Further, such instructions may need to be presented in a clear fashion so a user can quickly parse the instructions while operating the vehicle (e.g., a bicycle), so simply displaying a map may not suffice. Therefore, presenting navigation directions (e.g., turn-by-turn directions that progress automatically as the user travels along a segment) in the panel 344 may provide clearer instructions that can be more easily visually parsed. Furthermore, to have sufficient room to display the turn-by-turn directions, a height of the panel 344 may change (e.g., the panel 344 may be higher). In certain implementations, the specific directions may include haptic feedback so that the user can receive directions without looking away from the modality they are using. For example, the haptic feedback may include vibrations (e.g., particular patterns of vibration) of haptic actuators to indicate left turns and right turns. In certain implementations, the haptic feedback may be presented via the mobile device or another computing device (e.g., a smartwatch or other wearable computing device) that is communicatively coupled to the mobile device. In further implementations, the haptic feedback may be presented via a portion of a bicycle or scooter (e.g., by vibrating corresponding handlebars of the bicycle or scooter to indicate a left/right turn). In additional or alternative implementations, directions may be presented to users by illuminating lights on the handlebars of the bicycle or scooter (e.g., by illuminating a light on the right handlebar to indicate a right turn and/or illuminating a light on the left handlebar to indicate a left turn) and/or providing audio feedback (e.g., audio feedback from audio speakers located on the left handlebar to indicate a left turn and on the right handlebar to indicate a right turn and/or different patterns or tones of audio feedback to indicate different turns). The turn-by-turn directions for a user may include turn-by-turn directions to an ending location 226 of a segment associated with the bicycle. For example, for a docked bicycle, the navigation directions may be to a dock (e.g., a docking station) to deposit the bike and/or for a dockless bicycle, the navigation directions may be to a recommended location to deposit the dockless bicycle, as discussed above. In still further implementations, the instructions 356 may include instructions for accessing a bicycle, including how to pay and/or may identify which bicycle to access (e.g., a bicycle reserved for use by the user).

An interface similar to the interface 340 may be utilized to display guidance information related to riding a scooter. For example, similar guidance information (e.g., regarding where to access/deposit a scooter, turn-by-turn directions) may be presented in panels similar to the panel 344. As another example, haptic feedback and/or illuminated lights may be used to convey the directions to users riding scooters without them having to take their eyes off of the road.

The interface 360 may be displayed to present guidance information to a user that is walking. For example, the interface 360 may be displayed to a user after disembarking a train (e.g., after disembarking the train as discussed above in connection with the interface 320). The interface 360 includes a map 362 and a panel 364. The map 362 includes an indication of the current location 366 of the mobile device displaying the interface 360. The map 362 also includes visual indications of paths 368, 370. The path 370 may depict the path taken for a previous segment (e.g., a segment in which the user rode a train) and the path 368 may depict the path a user is taking while walking (e.g., while walking to their final destination after disembarking the train). In certain implementations, because the user is not operating a vehicle, the map 362 may display additional information (e.g., information regarding stores and/or other points of interest in the depicted area of the map). Furthermore, a zoom level of the map 362 of the interface 360 may be selected based on the modality associated with the interface 360. For example, because a user may be traveling slower while walking as compared to other modalities, a closer zoom level (e.g., displaying a smaller geographic area) may be appropriate to provide more room on the display for nearby navigation instructions. In fact, although the maps 322, 362 concern similar geographic areas, the map 362 is displayed at a closer zoom level than the map 322 (e.g., because the interface 360 is associated with a walking modality and the interface 320 is associated with a train modality. The panel 364 may display a visual indication 372 and instructions 374. The visual indication 372 may adjust depending on how a predicted time compares with a starting time, as discussed above. The instructions 374 may include information on next steps for a user. In the depicted example, the instructions 374 indicate that the user should walk to their destination. In additional or alternative examples, the instructions 374 may indicate additional actions, such as navigation directions and/or other instructions (e.g., how to enter a transit station or locate a bicycle/scooter dock).

Figure 4:
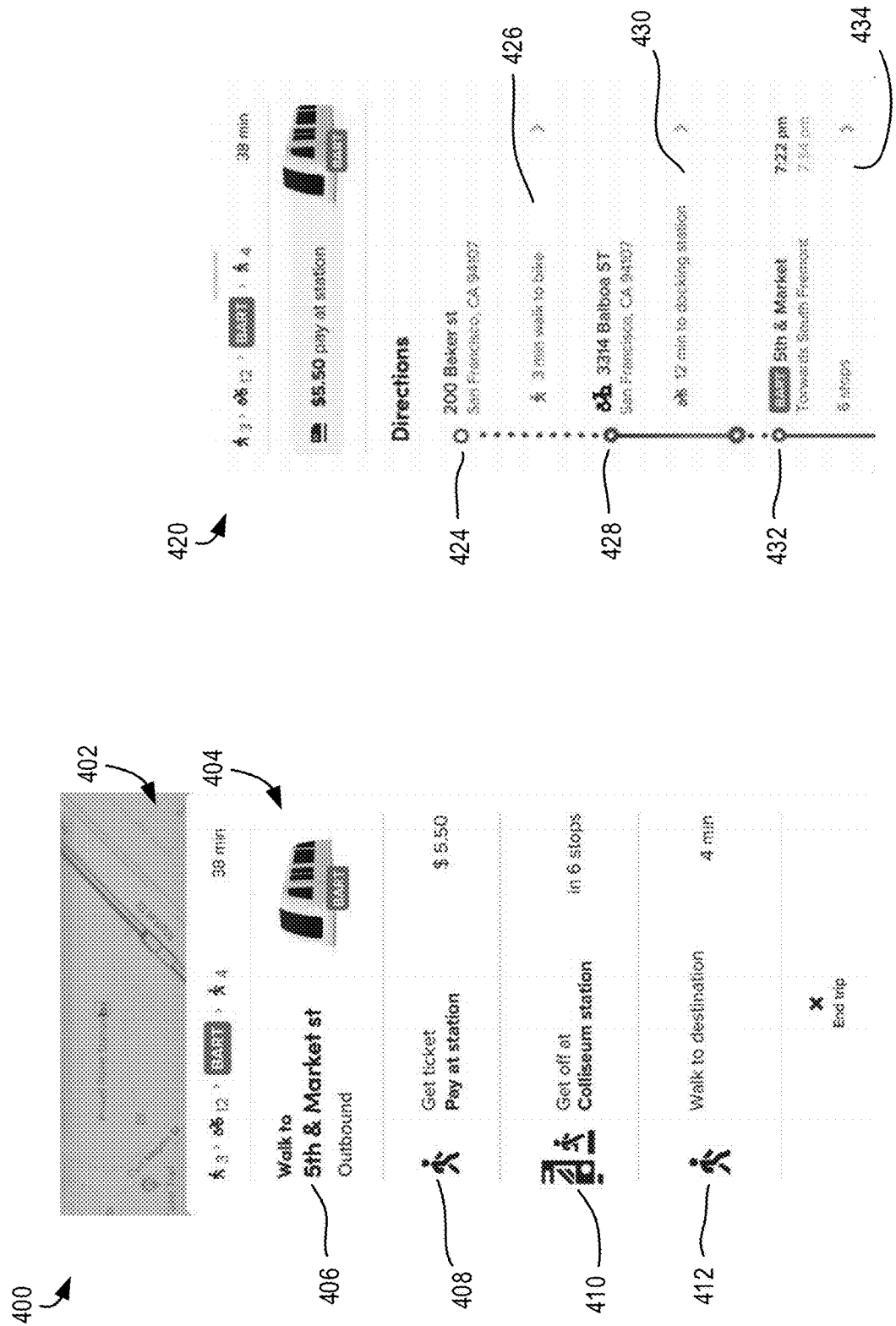
FIG. 4 illustrates interfaces for display of guidance information according to exemplary embodiments of the present disclosure.
Figure 5A:
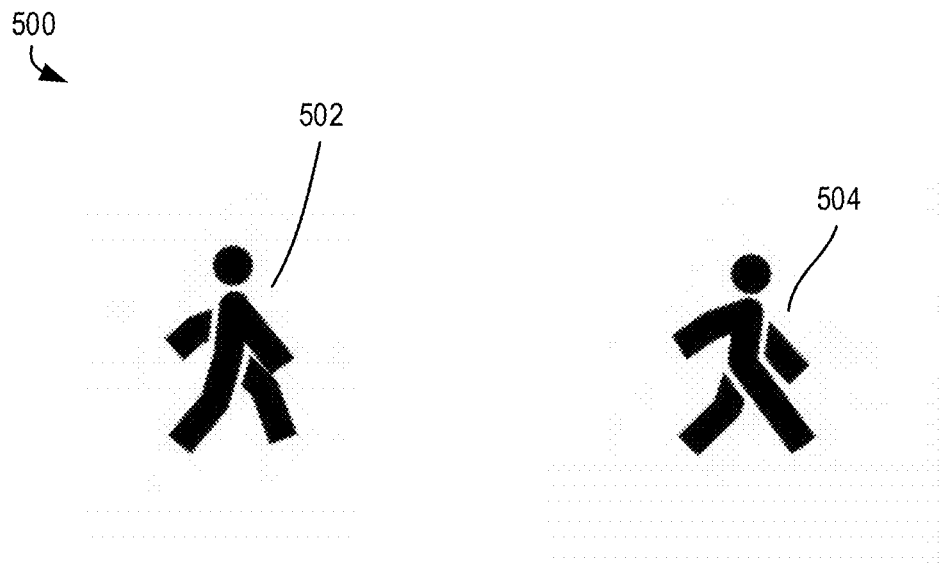
FIGS. 5A-5E illustrate visual indicators of trip statuses according to exemplary embodiments of the present disclosure.
Figure 5B:
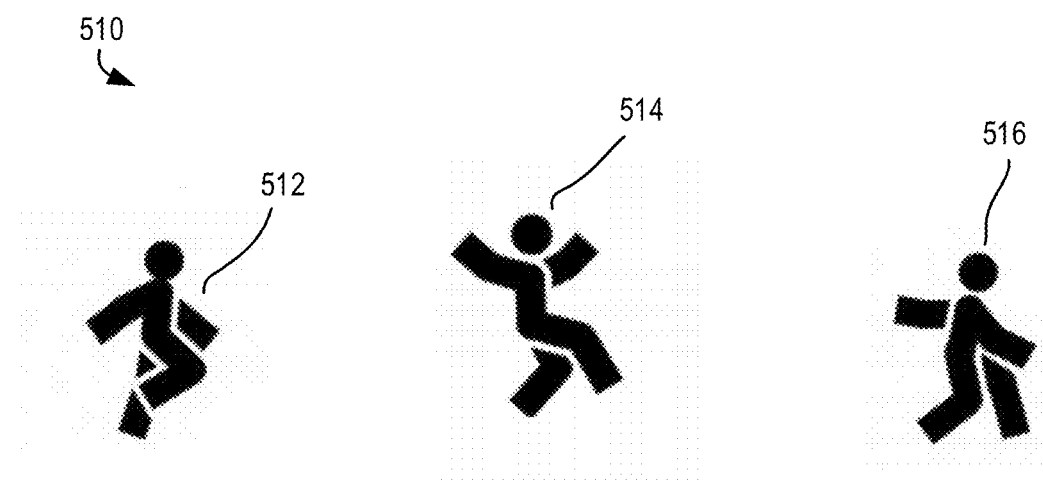
Figure 5C:
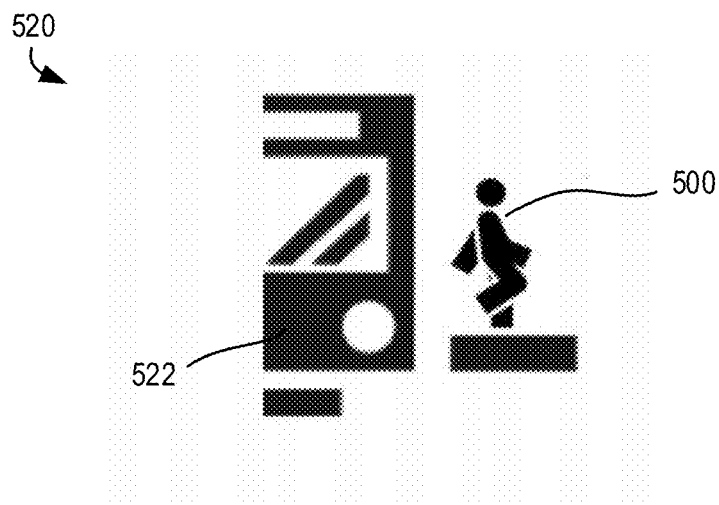
Figure 5D:
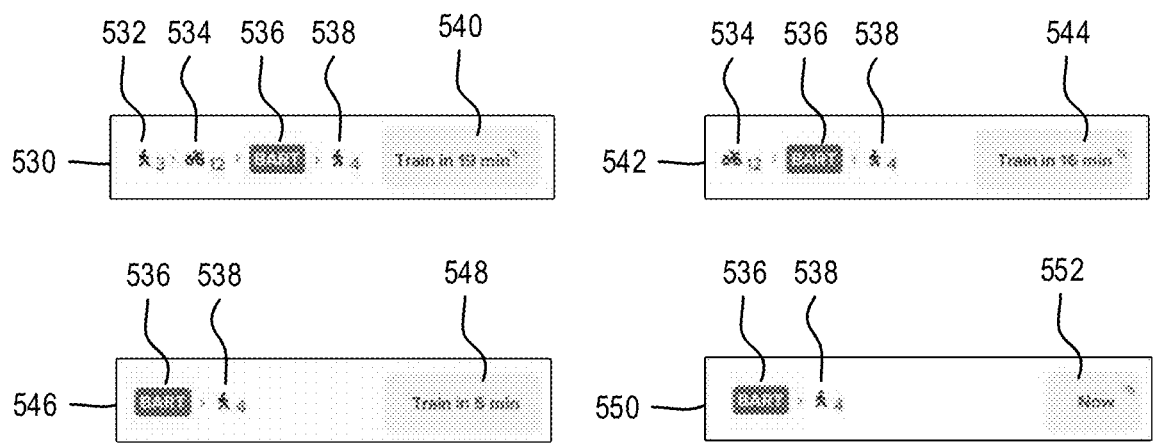
Figure 5E:
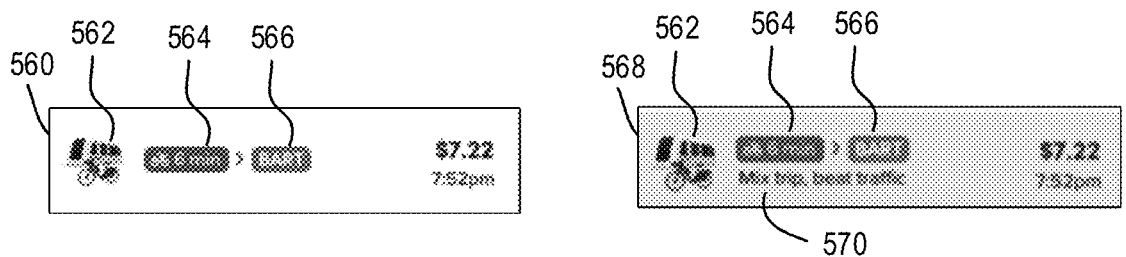

FIG. 4 illustrates interfaces 400, 420 for display of guidance information according to exemplary embodiments of the present disclosure. The interfaces 400, 420, 440 may be displayed on a mobile device, such as the mobile device 202. In particular, the interfaces 400, 420, 440 may illustrate additional information that may be displayed in connection with the interfaces 300, 320, 340, 360 of FIGS. 3A-3B. In particular, the interfaces 400, 420 may depict additional or alternative implementations of the interfaces 300, 320. For example, the interface 400 includes a map 402 and a panel 404. The map 402 is dimmed and may represent a dimmed version of the maps 302, 322 of the interfaces 300, 320. The panel 404 may be generated to display additional information as compared to the panels 304 (e.g., may be dragged into an expanded position that is taller to provide space for additional information). For example, in addition to instructions 406 instructing the user to walk to the 5th St. and Market St. transit station, the panel 404 includes additional instructions 408, 410, 412 respectively instructing the user in accessing the train, riding the train, and/or later steps in following the transportation route. For example, the instruction 408 instructs the user to pay at the station to get a ticket for the train, the instruction 410 instructs the user to ride to a particular stop (e.g., the Coliseum Station), and the instruction 412 instructs the user in later steps for the transportation route (e.g., walking to their final destination). In additional or alternative implementations, the panel 404 may include instructions for, e.g., navigating a transit station and/or locating a particular train platform, as discussed above. In certain implementations, a ticket may be purchasable via the interface 400 if a user has sufficient funds in a payment account (e.g., in a transit payment account) and/or has a pre-stored payment method. In such instances, tapping the instruction 408 may enable payment for a transit ticket (e.g., by interacting with a transit system, enabling NFC-based transmission of payment information). If, however, there are insufficient funds in the payment account or there is no pre-stored payment method, the instructions 408 may indicate that a transit ticket should be purchased from a transit authority.

The interface 420 depicts a panel, which may be an alternative implementation of the panel 404. The interface 420 includes information summarizing an overall transportation route. For example, the interface 420 includes indications 424, 428, 432 of three different segments of the transportation route (e.g., a walking segment, a biking segment, and a train segment). The indications 424, 428, 432 of the segments also include additional summary information 426, 430, 434 of the segments, which may include a high-level overview of the segment. For example, the summary information 426 indicates that the walking segment includes a three-minute walk (e.g., that the walking segment has a predicted time of three minutes), the summary information 430 indicates that the biking segment includes a 12-minute bicycle ride (e.g., that the biking segment has a predicted time of 12 minutes), and the summary information 434 indicates that the train segment will last for 6 stops. The predicted travel times displayed for the segments may include a predicted travel time and/or a predicted transition time. In certain implementations, the summary information 426, 430, 434 may be selectable to display additional information. For example, a user may tap or otherwise select the summary information 426, 430, 434 to display additional information (e.g., turn-by-turn directions, transit stop overview, stop and/or dock location names) for the corresponding segment of the transportation route.

Although the interfaces 400, 420 are depicted in the context of a train riding segment, similar techniques may be used in connection with other interfaces. For example, the panel of an interface displayed while a user is using a bicycle and/or scooter may be dragged up or otherwise expanded to display additional turn-by-turn directions and/or the panel of an interface displayed while a user is walking may be expanded to display a summary of the transportation route (or future segments of the transportation route) similar to the interface 420.

FIGS. 5A-5E illustrate visual indicators 500, 510, 520, 530, 542, 546, 550, 560, 568 of trip statuses according to exemplary embodiments of the present disclosure. The visual indicators 500, 510, 520, 530, 542, 546, 550, 560, 568 may be depicted as part of the interfaces 300, 320, 340, 360, 400, 420. In particular, the visual indicators 500, 510, 520 may be generated to indicate particular rates of progress. For example, the visual indicators 500, 510, 520 may be generated to depict one or more of a slow rate of progress, a medium rate of progress, and a fast rate of progress. The visual indicator 500 may depict a representation of a medium rate of progress (e.g., a person that is walking). For example, the visual indicator 500 may depict an animated representation of a person that is walking. In particular, the visual indicator 500 includes states 502, 504 which in combination (e.g., in combination with other states that are not depicted) may combine to depict an animated representation of a walking person. The visual indicator 510 may depict a representation of a slow rate of progress (e.g., a person that is skipping). For example, the visual indicator 510 may depict an animated representation of a person that is skipping. In particular, the visual indicator 510 includes states 512, 514, 516 which in combination (e.g., in combination with other states that are not depicted) may combine to depict an animated representation of a walking person. As explained further above, the visual representations 500, 510 may be displayed in an interface based on how a user's predicted time of arrival at a starting location for a segment compares to a start time of the segment. In particular, the visual indication 500, 510 may further include a visual indication of a fast rate of progress (e.g., a person running (not depicted)), and one of the visual indications may be selected based a predicted likelihood of arriving at a subsequent segment prior to a start time of the segment (e.g., based on a predicted time 208 and/or a rate of progress of the mobile device 202.

The visual indications 500, 510 may also be combined with visual indicators of different types of vehicles. For example, the visual indicator 520 depicts the visual indicator 500 in combination with a visual indicator 522 of a train. Additional or alternative examples may combine the visual indicator 510 with the visual indicator 522 and/or may combine the visual indicators 500, 510 with visual indicators of other types of vehicles (e.g., buses and/or automobiles). In still further implementations, additional visual indicators may be used for other types of rideable vehicles. For example, visual indicators of bicycles may include representations of a person riding a bicycle at a medium rate of progress, riding a bicycle at a slow rate of progress, and riding a bicycle at a fast rate of progress. As another example, visual indicators of scooter may include representations of a person scooter at a medium rate of progress, riding a scooter at a slow rate of progress, and riding a scooter at a fast rate of progress.

Using indicators such as the visual indicators 500, 510, 520 may enable the mobile device to provide an intuitive indication of the rate of progress required to successfully complete a transportation route. In particular, where the visual indicators 500, 510, 520 are animated, the mobile device may be able to indicate a required rate of progress without having to clutter the interface with unnecessary text features. Further, because such visual indications may be generated based on a current modality associated with the mobile device, the interface can adapt to a current state of the transportation route, improving the accuracy of the depicted representation of the rate of progress.

The visual indicators 530, 542, 544, 550, 560, 568 may be utilized to display information summarizing a transportation route (e.g., remaining segments of a transportation route) and/or a time remaining (e.g., a time remaining until a start time of a segment and/or a time remaining to complete the transportation route). For example, the visual indicators 530, 542, 544, 550 may be displayed on a panel of an interface, similar to the visual indicator 311 of FIG. 3A.

The visual indicator 530 includes identifiers 532, 534, 536, 538 of segments of a transportation route (e.g., a transportation route that a user is following). For example, the visual indicator 530 may include identifiers of all upcoming segments of a transportation route and/or for a predetermined number of upcoming segments (e.g., four upcoming segments). In particular, the visual indicator includes an identifier 532 of a walking segment, and identifier 534 of a biking segment, an identifier 536 of a train segment, and an identifier 538 of a walking segment. The identifiers 532, 534, 536, 538 may include information regarding a duration of the corresponding segments. For example, the identifiers 532, 534, 538 include numeric identifiers (e.g., "3," "12," and "4") of the durations of the corresponding segments (e.g., 3 minutes, 12 minutes, 4 minutes). The identifiers 532, 534, 536, 538 may allow for dense display of information regarding a transportation route without requiring a large portion of screen space, which may instead be used to depict additional information (e.g., guidance information and/or maps).

The visual indicator 530 also includes an identifier 540 of a remaining time. As depicted, the identifier 540 displays the remaining time until a start time of a segment of the transportation route (e.g., a remaining time until a train arrives/departs that is needed to complete the segment corresponding to the identifier 536). To generate the identifier 540, a mobile device may compare a current time to a start time of a segment that includes a start time and may generate the identifier 540 to depict the difference. In implementations where the transportation route includes multiple segments, the identifier 540 may be generated to display a remaining time until an earliest of the multiple segments and/or to display a remaining time for more than one of the multiple segments. In further implementations, a segment may include multiple start times (e.g., where trains arrive at the same transit station at multiple times). In such instances, the identifier 540 may be generated to depict multiple start times (e.g., two or three start times) and/or multiple arrival times (e.g., two or three arrival times). Such implementations may enable a user to see earlier arrival times if the predicted time indicates that the user is likely to arrive at the starting location of a segment before an initially-predicted start time of the segment and/or to see later arrival times if the predicted time indicates that the user is likely to arrive at the starting location after the starting time of the segment. In still further implementations, the identifier 540 may be generated to depict a time remaining for the transportation route. For example, a mobile device may predict a remaining travel time (e.g., using any of the travel time prediction techniques discussed herein) and may display the remaining travel time within the identifier 540.

The visual identifiers 530, 542, 546, 550, 560, 568 may update as a user progresses through a transportation route. For example, the visual identifier 542 may be displayed after determining that a user has walked to access a bicycle (e.g., after detecting a trigger event indicating that the user has arrived at the bicycle). In response, the visual identifier 542 may be displayed that includes the identifier 534, 536, 538, but does not include the identifier 532 (e.g., because the corresponding segment is complete). Similarly, the indicator 544 may be updated to indicate that the train arrives in 16 minutes instead of 19 minutes. As another example, the visual identifier 546 may be displayed after determining that the user has arrived at a transit station and has completed the biking segment. In response, the visual identifier 546 may be displayed to include identifiers 536, 538, but not include the identifier 534 for the completed biking segment. Also, the indicator 548 may be updated to indicate that the train arrives in 5 minutes instead of 16 minutes. As a further example, the visual identifier 550 may be displayed at a later time when the train is arriving and may include an indicator 552 that the train is arriving. In combination, the visual identifiers 530, 542, 546, 550 may enable efficient display of the transportation while in progress and may enable the user to see key information (e.g., start times of future segments) without taking up excessive screen space.

In certain implementations, tapping or selecting an indicator may display more information regarding an associated trip. For example, the visual identifier 560 includes an indicator 562 that depicts visual representations of the types of modalities used during the corresponding transportation route (e.g., a train and a bicycle). The visual identifier 560 also includes additional indicators 564, 566 respectively depicting additional information regarding each modality. In particular, the indicator 564 depicts a visual representation of a bicycle, including an indication of an approximate time to complete the corresponding segment (e.g., six minutes). Also, the indicator 566 depicts additional information regarding a train modality on the route (e.g., that the train is a BART train). Furthermore, the indicators 564, 566 may be generated in the same color as the routes displayed on the maps discussed above. For example, the indicator 564 may be generated in purple or pink like the path 348 and the indicator 566 may be generated in blue like the paths 306, 330, 370. If the mobile device detects that a user has selected the visual identifier 560, the visual identifier 568 may be displayed. The visual identifier 568 may have a different-colored background, which may visually indicate that the visual identifier 568 has been selected. In addition to the indicators 562, 564, 566, the visual identifier 568 includes an indicator 570 including a textual summary of the transportation route, including how the transportation route compares to other transportation routes. In particular, the indicator 570 says "Mix trip, beat traffic." Accordingly, the indicator 570 may indicate that the trip mixes (e.g., uses) multiple modalities and that following the corresponding route allows the user to avoid traffic or congestion that would impede transportation routes using other modalities. To generate the indicator 570, the corresponding route may be compared to other generated routes (e.g., by comparing a quantity of segments, a quantity of modalities, a price of the routes, and/or a predicted travel time of the routes) and the indicator 570 may be generated to identify one or more differences between the corresponding route and the other generated routes.

Figure 6:
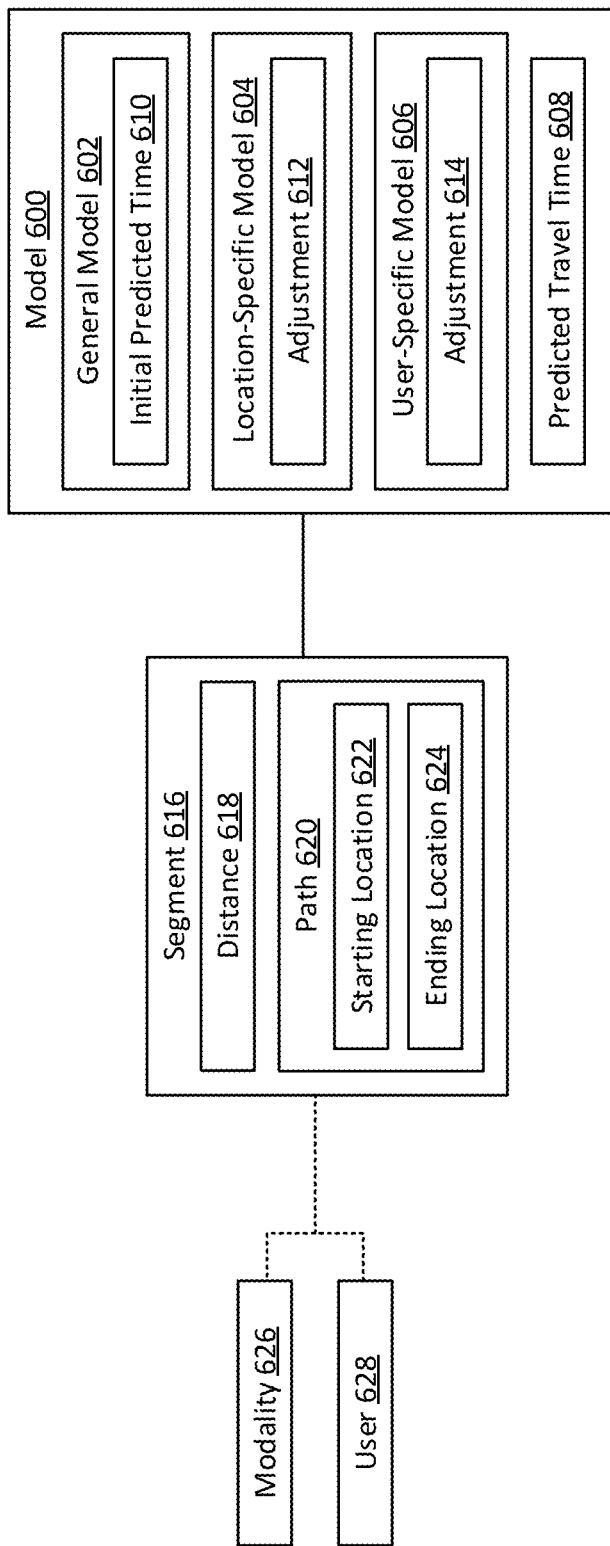
FIG. 6 illustrates a model for predicting user arrival times according to an exemplary embodiment of the present disclosure.

FIG. 6 illustrates a model 600 for predicting user arrival times according to an exemplary embodiment of the present disclosure. The model 600 may be configured to receive a segment 616 and to determine a predicted travel time 608 for the segment 616. For example, the model 600 may be an exemplary implementation of a model used by the mobile device 202 to determine the predicted time 208. The segment 616 may include a path 620 with a starting location 622 and an ending location 624. The path 620 and/or the segment 616 may cover a particular distance 618. The segment 616 may further be associated with a particular modality 626 and may correspond to a particular user 628.

To generate the predicted travel time 608, the model 600 may include a general model 602, a location-specific model 604, and/or a user-specific model 606. The models 602, 604, 606 may be trained based on one or more datasets of transportation routes that were previously completed. For example, the models 602, 604, 606 may be trained based on datasets of transportation routes that were completed previously and include segments with one or more of a similar distance, a similar modality, similar starting locations and/or ending locations, similar traffic conditions, similar times of day, similar weather, and/or similar users (e.g., users that walk, bicycle, and/or ride scooters at a similar speed as the user 628). The models 602, 604, 606 may be configured to generate different aspects of the predicted travel time 608. For example, the general model 602 may be trained to generate an initial predicted time 610 for the segment, the location-specific model 604 may be trained to generate an adjustment 612 based on a predicted transition time determined based on transition times near the starting and/or ending locations 622, 624, and the user-specific model 606 may be trained to generate an adjustment 614 based on movement speeds of the user 628 with the modality 626. The models 602, 604, 606 may therefore be trained differently. For example, the general model 602 may be trained to identify segments that are previously-completed and that are similar to the segment 616 (e.g., that have similar starting locations, ending locations, modalities, weather, time of day) and may generate the initial predicted time 610 based on the segments that are identified (e.g., as an average or other weighted combination of the segments that are identified). As another example, the location-specific model 604 may be trained to identify delays associated with particular locations. For example, the location-specific model 604 may be trained to identify transition times between one or more segments of a trip. The transition times may specify a duration of time between a user completing travel along one segment and the user arriving at the starting location of a next segment. For example, the transition time may reflect the time required to access vehicles at specific locations (e.g., to purchase a ticket, to navigate a transit station to a platform from which a bus or train can be boarded, to retrieve or deposit a bicycle at a dock, to navigate to a location where automobiles are authorized to pick up individuals) based on transportation routes that are completed previously that include the locations. The location-specific model 604 may then determine an adjustment 612 based on locations associated with the segment 616. For example, if the location-specific model 604 determined that the starting location 622 and the ending location 624 have associated transition times (e.g., 5 minutes to access and board a train at the starting location and 3 minutes the disembark and leave a transit station at the ending location 624), the location-specific model 604 may determine the adjustment 612 based on the transition times (e.g., by adding the transition times together for an adjustment of 8 minutes). As a further example, the user-specific model 606 may be trained to determine an adjustment 614 based on transportation routes previously completed by the user while using the modality 626. For example, the user-specific model 606 may determine a typical movement speed for the user 628 using certain modalities (e.g., walking, bicycling, riding a scooter) and may compare the user's 628 movement speed to typical movement speeds using the modalities in previously-completed transportation routes. The adjustment 614 may be calculated based on how the user's speed compares to the typical movement speeds. For example, if the user's 628 movement speed is faster while riding a bicycle than the average user's movement speed while riding a bicycle, the adjustment 614 may be adjusted to decrease the initial predicted time 610. As another example, if the user's 628 movement speed is slower while riding a bicycle than the typical movement speed, the adjustment 614 may be adjusted to increase the initial predicted time 610. In certain instances, the user-specific model 606 may be configured to determine movement speeds for the user 628 across multiple different modalities. For example, the user-specific model 606 may determine movement speeds for the user 628 while riding a bicycle, riding a scooter, and walking. In further implementations, the user-specific model 606 may generate the adjustment 614 at least in part to account for a difference in the predicted transition time for the user 628 as compared to typical users at the starting location 622. For example, the user-specific model 606 may determine, based on previously completed trips by the user 628, that the user has completed multiple trips that include accessing the modality 626 at the starting location 622 or at locations similar to the starting location 622. In such instances, the adjustment 614 may be determined to reduce the predicted transition time predicted at the starting location 622. As another example, the user-specific model 606 may determine that the user has not completed many trips at the starting location 622 or at locations similar to the starting location 622. In such instances, the adjustment 614 may be determined to increase the predicted transition time predicted at the starting location 622. In particular, the adjustment 614 may be determined to provide sufficient buffer time for a user to transition to the modality 626 (e.g., to purchase a train ticket, etc.)

In certain implementations, the adjustments 612, 614 may be determined at least in part prior to receiving the segment 616. For example, the transition times for particular locations may be identified by the location-specific model 604 and/or the movement speeds for the user 628 may be identified by the user-specific model 606 prior to receiving the segment 616.

The model 600 may then determine the predicted travel time 608 based on the initial predicted time 610 and the adjustments 612, 614. For example, the model 600 may combine the initial predicted time 610 with the adjustments 612, 614 to generate the predicted travel time 608. As a specific example, the initial predicted time 610 may be 15 minutes for the segment 616 (e.g., a biking segment), the adjustment may be 5 minutes (e.g., to access and/or deposit the bicycle), and the adjustment 614 may be −3 minutes. In such instances, the predicted travel time 608 may be 17 minutes. In certain implementations, the model 600 may not include one or both of the location-specific model 604 and the user-specific model 606. In such instances, the adjustments 612, 614 may not be determined and may not be combined with the initial predicted time 610 to generate the predicted travel time 608.

The techniques discussed above may be used by the model 600 to generate predicted travel times 608 for more than one segment 616 of a transportation route. For example, the model 600 may determine a predicted travel time 608 for one or more segments that occur before a segment of the transportation route that includes a start time. In such instances, the predicted travel times 608 may be combined to determine a predicted travel time until the start time. In still further implementations, the model 600 may determine a predicted travel time 608 for segments 616 that are currently in progress. In such instances, the model 600 may determine the predicted travel time 608 between a current location of the user 628 and the ending location 624.

Figure 7A:
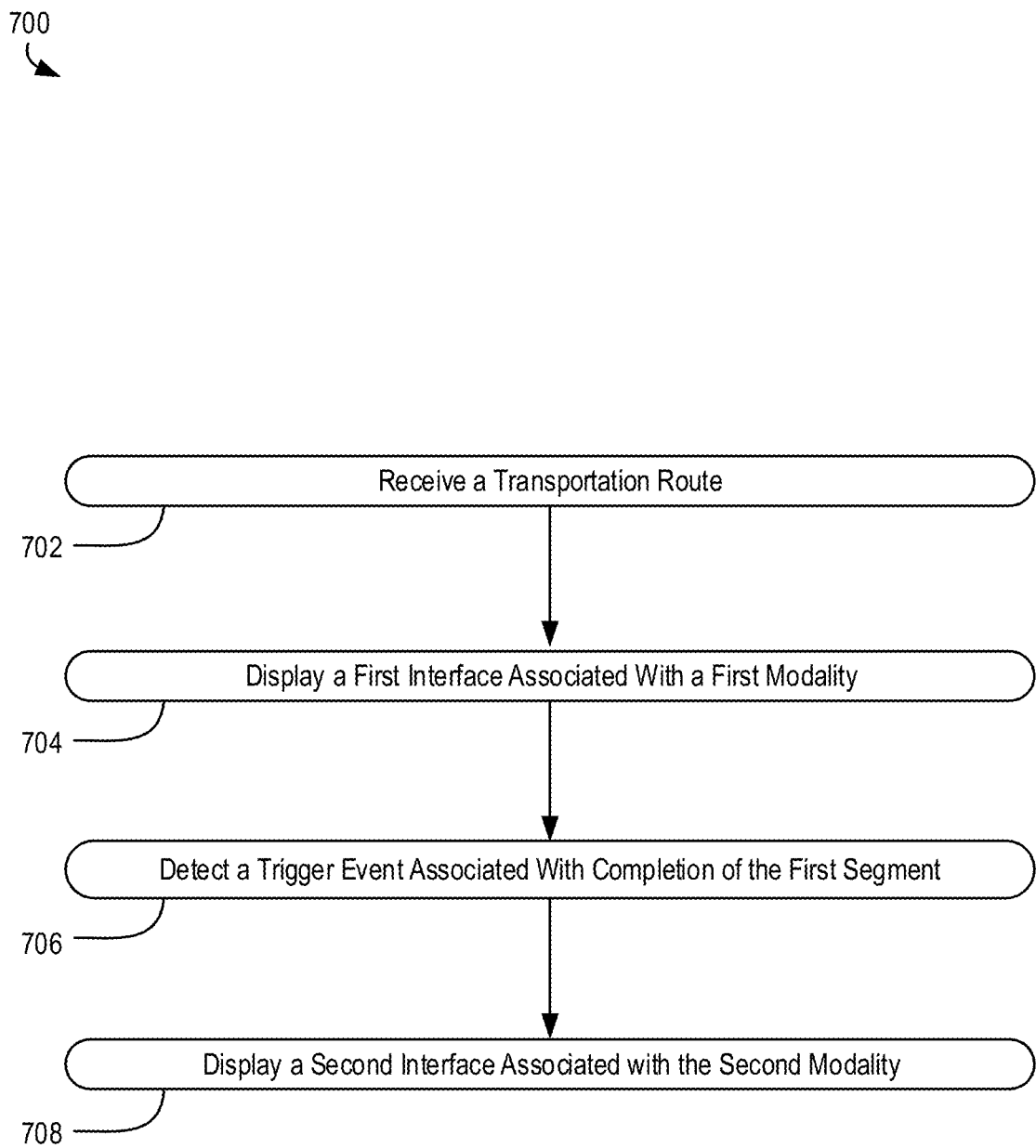
FIGS. 7A-7B illustrates methods for responsively displaying guidance information according to an exemplary embodiment of the present disclosure.
Figure 7B:
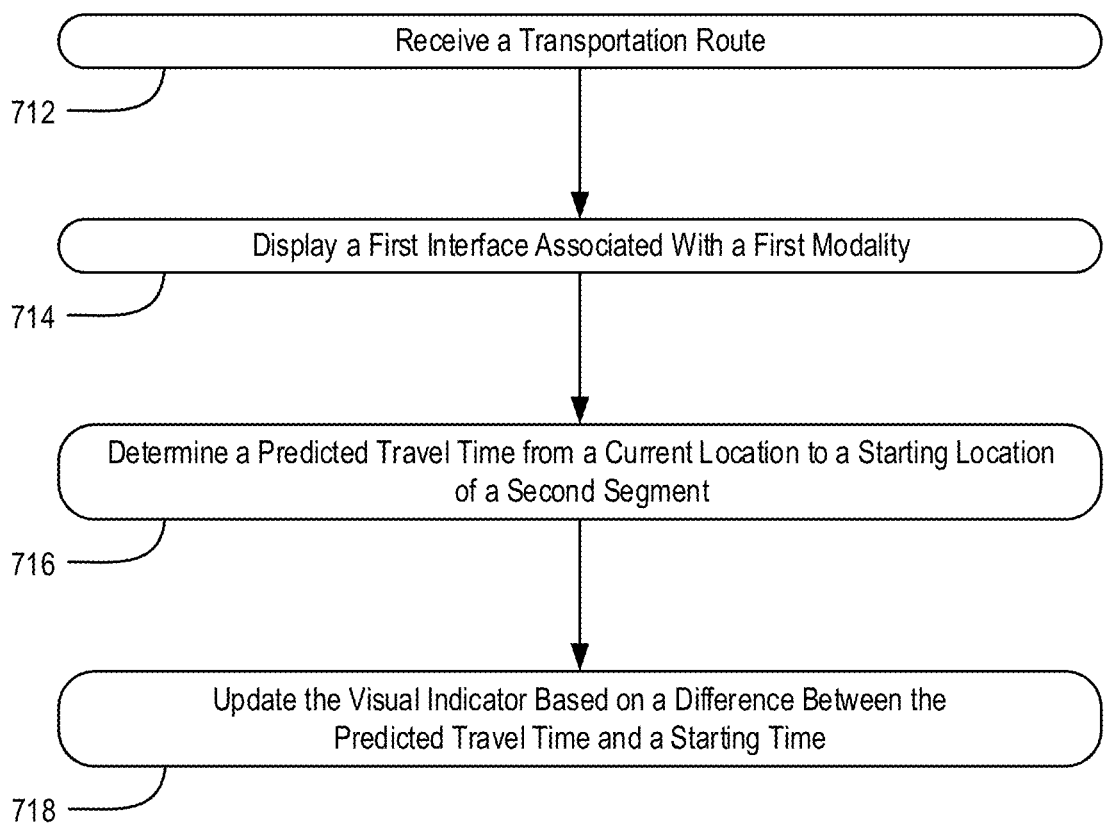

FIGS. 7A-7B illustrate methods 700, 710 for responsively displaying guidance information according to an exemplary embodiment of the present disclosure. The method 700 may be performed to responsively display interfaces for different modalities of a transportation route and to update the interfaces based on a progress of the transportation route. The method 700 may be implemented on a computer system, such as the system 200. For example, the method 700 may be implemented at least in part by the mobile device 202. The method 700 may also be implemented by a set of instructions stored on a computer readable medium that, when executed by a processor, cause the computer system to perform the method 700. For example, all or part of the method 700 may be implemented by the processor 252 and the memory 254. Although the examples below are described with reference to the flowchart illustrated in FIGS. 7A-7B, many other methods of performing the acts associated with FIGS. 7A-7B may be used. For example, the order of some of the blocks may be changed, certain blocks may be combined with other blocks, one or more of the blocks may be repeated, and some of the blocks described may be optional.

The method 700 may begin with receiving a transportation route (block 702). The transportation route may specify a route for transportation between two locations (e.g., from a starting location to an ending location). Also, the transportation route may include multiple segments, such as a first segment associated with a first modality (e.g., transportation by bicycles) and a second segment associated with a second modality (e.g., transportation by train). In still further implementations, the transportation route may include a predicted travel time for all or part of the transportation route (e.g., a predicted travel time for the transportation route overall and/or a predicted travel time for one or more segments of the transportation route).

The mobile device may display a first interface associated with a first modality (block 704). As explained above, the first modality may be a modality associated with a first segment of the transportation route, such as an initial segment of the transportation route and/or a current segment of the transportation route. As also explained above, the mobile device may include different interfaces that are associated with different modalities and the first interface may be identified based on the first modality for the segment that is being displayed. In certain instances, the first interface may display guidance information regarding a transportation route. For example, the guidance information may include turn-by-turn directions or other instructions, as discussed above in connection with the interfaces 300, 320, 340, 360, 400, 420. As another example, the guidance information may include a travel time (e.g., a predicted or remaining travel time) of the transportation route and/or the first segment. The mobile device (e.g., a processor of the mobile device) may display the first interface by causing a display panel or other visual interface of the mobile device to display the first interface.

A trigger event associated with the first segment may be detected (block 708). For example, the mobile device may receive or otherwise identify information associated with completion of the first segment. The trigger event may be associated with the first modality (e.g., may indicate a completion or near completion of a segment associated with the first modality) and/or the second modality (e.g., may indicate the beginning of a segment associated with the second modality). The trigger event may be identified at least in part based on information detected using one or more sensors of the mobile device (e.g., location sensors, accelerometers, gyroscopes, cellular connectivity, altitude sensors, pressure sensors). For example, the trigger event may include detecting that the mobile device's location has entered a geofence around a starting location of the second segment and/or has exited a geofence around an ending location of the first segment. As another example, the trigger event may include detecting that the mobile device has lost cellular connectivity (e.g., after going underground to enter a subway transit station). As a further example, the trigger event may include detecting (e.g., via accelerometer and/or gyroscope sensors of the mobile device) a telematics pattern indicative of the second modality. In one specific example, the telematics pattern may include an acceleration of the mobile device that exceeds a predetermined threshold for a predetermined period of time (e.g., indicating that the user has entered an automobile, train, or bus capable of accelerations faster than bicycles or scooters). In certain implementations, the mobile device may count the number of times the acceleration exceeds the predetermined threshold in order to determine the number of stops a user has ridden (e.g., on a train). In still further examples, the trigger event may include detecting a change in altitude of the mobile device (e.g., based on altitude sensors when the user changes altitude to access a transit stop).

In still further implementations, the trigger event may be determined at least in part based on information received from sources other than the mobile device (e.g., other mobile devices and/or computing devices associated with transit providers). For example, the mobile device may receive information indicating that a bicycle and/or scooter associated with a user of the mobile device has been docked/undocked at a station and/or locked/unlocked at a particular location. Based on such information, the mobile device may determine that a bicycle/scooter segment is complete if the bicycle/scooter is docked/locked and may determine that a bicycle/scooter segment has begun if the bicycle/scooter is undocked/unlocked. As another example, the mobile device may receive an indication that the first segment is complete from a second mobile device associated with a vehicle. The vehicle may be associated with the first modality and may have at least partially fulfilled the first segment. For example, the second mobile device may be associated with an automobile that drove the user along the first segment. Upon completion of the first segment, the second mobile device may receive an indication that the first segment (e.g., the ride) is complete and may transmit an indication (e.g., directly or indirectly) to the mobile device displaying the first interface. Upon receiving the indication, the mobile device may determine that the first segment is complete. As a still further example, the mobile device may receive an indication that payment was processed for accessing a second modality associated with the second segment. In one specific example, the second segment may be associated with receiving transportation by train and the mobile device may receive an indication from a transit system associated with the train when the user pays to access the train (e.g., using a transit card or other payment method). In another specific example, the user may pay to access the second modality (e.g., the train) using the mobile device (e.g., an application running on the mobile device, such as an application displaying the first interface) and may receive confirmation when payment to access the second modality is accepted.

In certain implementations, the trigger events identified by the mobile device may depend on one or both of the first modality and the second modality. For example, certain types of trigger events (e.g., geofences) may not be available with certain modalities (e.g., underground trains). Instead, the mobile device may monitor for other trigger events (e.g., telematics patterns, changes in altitude).

A second interface associated with the second modality may then be displayed (block 708). For example, the mobile device may display the second interface associated with the second modality of the second segment. In particular, based on the determined trigger event, the mobile device may determine that the second segment has begun and, in response, may display the second interface. To display the second interface, the mobile device may identify an interface, such as one of the above-discussed interfaces, which is associated with the second modality and may include guidance information (e.g., the starting location, ending location, number of stops, directions) in the second interface associated with the second segment. The mobile device (e.g., a processor of the mobile device) may display the second interface by causing a display panel or other visual interface of the mobile device to display the second interface.

In certain implementations, all or part of the method 700 may be repeated. For example, block 706 may be repeated to detect a trigger event associated with completion of the second segment. The transportation route may further include a third segment associated with a third modality (e.g., transportation by scooter). Accordingly, block 708 may be repeated to display a third interface associated with the third modality. In this way, the method 700 may be able to flexibly adapt to transportation routes with different complexities (e.g., with a different number of segments).

By performing the method 700, the mobile device may be able to responsively detect trigger events indicating when a segment of a transportation route is complete and can automatically transition to displaying the second segment. Further, the mobile device may be able to utilize different types of interfaces to present information most relevant to the first and second modalities. Such adaptive interfaces may ensure that proper guidance information is displayed in an efficient manner to maximize the information density.

The method 710 may begin with receiving a transportation route (block 712). The transportation route may specify a route for transportation between two locations (e.g., from a starting location to an ending location). Also, the transportation route may include multiple segments, such as a first segment associated with a first modality (e.g., transportation by bicycles) and a second segment associated with a second modality (e.g., transportation by train). In still further implementations, the transportation route may include a predicted travel time for all or part of the transportation route (e.g., a predicted travel time for the transportation route overall and/or a predicted travel time for one or more segments of the transportation route).

The mobile device may display a first interface associated with a first modality (block 714). As explained above, the first modality may be a modality associated with a first segment of the transportation route, such as an initial segment of the transportation route and/or a current segment of the transportation route. As explained above, the mobile device may include different interfaces that are associated with different modalities and the first interface may be identified based on the first modality for the segment that is being displayed. In certain instances, the first interface may display guidance information regarding a transportation route. For example, the guidance information may include turn-by-turn directions or other guidance information, as discussed above in connection with the interfaces 300, 320, 340, 360, 400, 420. As another example, the guidance information may include a travel time (e.g., a predicted or remaining travel time) of the transportation route and/or the first segment. The mobile device (e.g., a processor of the mobile device) may display the first interface by causing a display panel or other visual interface of the mobile device to display the first interface.

A predicted travel time may then be determined from a current location to a starting location of a second segment (block 716). For example, the mobile device may determine a predicted time from a current location of the mobile device to a starting location of a second segment of the transportation route. The second segment may be identified as a segment of the transportation route that includes a start time, as discussed above. The predicted time may be determined based on an initial predicted duration of the route. For example, the transportation route may include a predicted duration to travel along the transportation route, which may include one or more predicted durations for segments of the transportation route. Additionally or alternatively, the predicted travel time may be determined based on the predicted durations, for example, based on the predicted duration for a remaining portion of the first segment and any intervening segments between the first segment and the second segment. The predicted time may also be predicted using a model, such as the model 600, and may be determined at least in part based on similar rides that were completed previously and one or more adjustments that are location-based and/or user-based. In particular, the predicted time may be determined to include both a travel time to the starting location of the second segment and a transition time to access the second modality. For example, if the first modality is transportation by bicycle and the second modality is transportation by train, the predicted time may include both a travel time by bicycle from the current location to the starting location and a transition time required to access the train at the starting location (e.g., to pay for a ticket and/or to navigate to a particular platform). In still further implementations, the predicted time may be determined based on a rate of progress of the mobile device (e.g., a rate of progress along the transportation route). For example, if the current location indicates that the mobile device is progressing at a faster rate of progress than is expected along the first segment, the predicted time for arriving at the starting location may be earlier than initially expected (e.g., initially predicted). Further, as discussed above, the predicted time may be generated to incorporate a user-specific adjustment, which may incorporate the user's current and/or previous rate of progress using the first modality or other modalities.

A visual indicator may be updated based on a difference between the predicted travel time and a starting time (block 718). For example, the mobile device may update a visual indicator of the first interface based on a difference between the predicted travel time and a starting time of the second segment. The mobile device may compare the predicted travel time to the remaining time (e.g., to the start time of the second segment) and may update the visual indicator based on a difference between the predicted travel time and the remaining time. For example, the visual indicator may be updated to indicate to a user whether a different rate of progress required for completion of the transportation route (e.g., to indicate that a faster rate of progress is needed and/or a slower rate of progress is permissible). As a specific example, the visual indicator may be updated to depict a representation of a faster rate of progress (e.g., a running person) if the predicted travel time is later than the starting time by more than a predetermined threshold (e.g., a progress threshold).

In certain implementations, other portions of the interface may be updated based on the difference between the predicted travel time and the starting time. For example, if the predicted time is later than the starting time by more than the progress threshold, the mobile device may determine that the transportation route cannot be completed, even with a faster rate of progress. If the difference exceeds the route update threshold, the mobile device may display a prompt (e.g., a notification) indicating that the transportation route cannot be successfully completed, or has a low probability of being successfully completed, based on the current rate of progress of the mobile device as reflected in the predicted travel time. The prompt may further present a selectable option to generate a new transportation route. If the user agrees, another transportation route may be generated and presented. For example, the new transportation route may be generated based on the current location of the mobile device, a current modality that is in use, and may comply with similar constraints as the transportation route received at block 712 (e.g., may include the same destination location included in the transportation route). Additionally or alternatively, the prompt may present an option to cancel the transportation route or to change the destination. For example, the user may deviate from a route to travel to a new location and, upon receiving the prompt, may update the destination to the new location. As another example, the prompt may include an option to cancel the route (e.g., if a user is riding a bicycle or scooter) so that the user can continue to travel without further guidance. Similar prompts may be presented if certain segments can no longer be successfully completed. For example, prompts similar to those discussed above may be presented to the mobile device if the user is currently riding a docked bicycle or scooter and the user's intended dock fills, or if a future segment is intended to use a bicycle or scooter and no more bicycles or scooters are available at the user's intended pickup location. In particular, if the second segment is associated with a second modality that is no longer available, a new transportation route can be generated that includes a different modality that is determined to be available. As another example, the prompt may offer to locate alternative docks if the intended dock fills.

In still further implementations, deviations of the mobile device from the transportation route may be used to detect fraud or other issues with the transportation route. For example, if the user's predicted time increases multiple times (e.g., because the current location of the mobile device continues to move away from the transportation route and/or suggested alternative routes), the mobile device may continue to present alerts to the mobile device. In particular, after a certain number of route updates and/or predicted time deviations (e.g., after a certain number of prompts), or if the user does not respond to the prompts for a predetermined period of time (e.g., five minutes, 10 minutes), the mobile device may determine that a potential fraud event (e.g., theft of bicycles and/or scooters) is occurring. Similarly, if a user accesses a bicycle and/or scooter (or other rideable vehicle) and the location and/or speed of the mobile device does not follow the location and/or speed of the bicycle or scooter (e.g., a distance between the mobile device and the bicycle and/or scooter may exceed a predetermined threshold), the mobile device may determine that potentially fraudulent behavior is occurring. As an example, the location of the bicycle and/or scooter may change while the location of the user device does not, which may be an indication that the user is not riding the bicycle and/or scooter. As another example, the mobile device may be moving at a different speed and/or in a different direction than the bicycle and/or scooter. As a further example, if a user is expected to board a particular train and/or bus, a location of the train and/or bus may be determined (e.g., via a transit authority) and compared to the location of the mobile device. If the location and/or speed of the mobile device does not follow the location and/or speed of the train and/or bus (e.g., the distance between the mobile device and the train and/or bus exceeds a predetermined threshold), the mobile device may determine that potentially fraudulent behavior is occurring. In still further implementations, a transportation route may indicate that the user will bring a first vehicle (e.g., a bicycle and/or scooter) onto a second vehicle (e.g., an automobile, bus, and/or train). In such instances, a location and/or speed of the first vehicle may be compared to a location and/or speed of the second vehicle. If the location and/or speed of the first vehicle does not follow the location and/or speed of the first vehicle (e.g., the distance between the mobile device and the train and/or bus exceeds a predetermined threshold), the mobile device may determine that potentially fraudulent behavior is occurring and/or that the user failed to bring the first vehicle onto the second vehicle.

If a potential fraud event is detected, a prompt may be presented by the mobile device indicating that a potential fraud event has been detected. The prompt may present an option to connect a user to a support system to assist the user with any problems (e.g., with a bicycle or scooter). The prompt may additionally or alternatively present instructions to return the vehicle to a dock for docked vehicles and/or to lock the vehicle in a secured location for dockless vehicles. If indications are not received that the vehicle has been docked or locked, a user account associated with the transportation route may be charged for the value of the vehicle. In still further implementations, sensor data from the mobile device and/or vehicle (e.g., accelerometer sensor data, magnetometer sensor data, gyroscope sensor data), may be analyzed to detect when a user has been in an accident. For example, if accelerometer data indicates a sharp acceleration, it may be determined that the user was in a potential collision (e.g., while riding a bicycle and/or scooter). In such instances, the mobile device may display a prompt with the option to contact emergency services.

By determining the predicted travel time and comparing the predicted travel time to the remaining time until the second segment, the method 710 may enable the mobile device to ensure that a user remains informed of the necessary rate of progress to successfully complete the transportation route without unnecessarily utilizing limited screen space. Also, in certain implementations, the blocks 716, 718 may be repeated. For example, the blocks 716, 718 may be repeated to determine predicted travel times and/or to update the visual indicator multiple times. As a specific example, the blocks 716, 718 may be repeated at regular intervals (e.g., every 50 ms, every 250 ms, every 1 second, every 30 seconds, every minute). In this way, the method 710 may further ensure that the visual identifier stays updated and displays the correct rate of progress.

Figure 8:
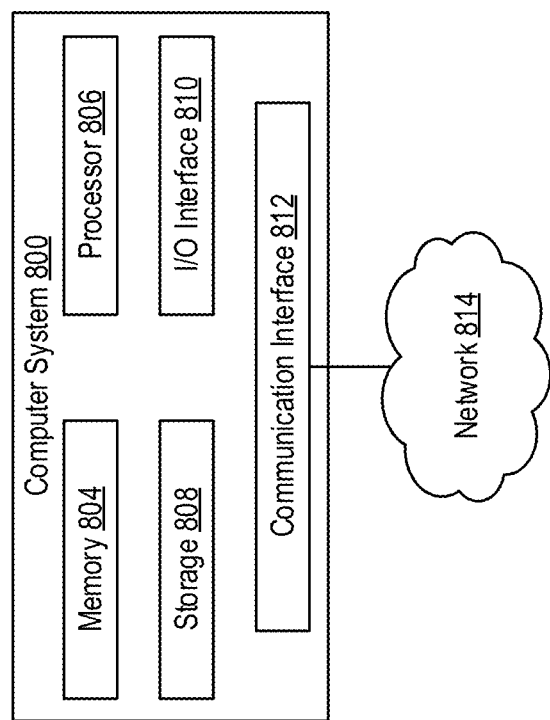
FIG. 8 illustrates a computing device according to an exemplary embodiment of the present disclosure.

FIG. 8 illustrates an example computer system 800 that may be utilized to implement one or more of the devices and/or components of FIG. 2 and FIG. 6, such as the mobile device 202 and/or the model 600. In particular embodiments, one or more computer systems 800 perform one or more steps of one or more methods described or illustrated herein. In particular embodiments, one or more computer systems 800 provide the functionalities described or illustrated herein. In particular embodiments, software running on one or more computer systems 800 performs one or more steps of one or more methods described or illustrated herein or provides the functionalities described or illustrated herein. Particular embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates the computer system 800 taking any suitable physical form. As example and not by way of limitation, the computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 806, memory 804, storage 808, an input/output (I/O) interface 810, and a communication interface 812. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 806 includes hardware for executing instructions, such as those making up a computer program. As an example and not by way of limitation, to execute instructions, the processor 806 may retrieve (or fetch) the instructions from an internal register, an internal cache, memory 804, or storage 808; decode and execute the instructions; and then write one or more results to an internal register, internal cache, memory 804, or storage 808. In particular embodiments, the processor 806 may include one or more internal caches for data, instructions, or addresses. This disclosure contemplates the processor 806 including any suitable number of any suitable internal caches, where appropriate. As an example and not by way of limitation, the processor 806 may include one or more instruction caches, one or more data caches, and one or more translation lookaside buffers (TLBs). Instructions in the instruction caches may be copies of instructions in memory 804 or storage 808, and the instruction caches may speed up retrieval of those instructions by the processor 806. Data in the data caches may be copies of data in memory 804 or storage 808 that are to be operated on by computer instructions; the results of previous instructions executed by the processor 806 that are accessible to subsequent instructions or for writing to memory 804 or storage 808; or any other suitable data. The data caches may speed up read or write operations by the processor 806. The TLBs may speed up virtual-address translation for the processor 806. In particular embodiments, processor 806 may include one or more internal registers for data, instructions, or addresses. This disclosure contemplates the processor 806 including any suitable number of any suitable internal registers, where appropriate. Where appropriate, the processor 806 may include one or more arithmetic logic units (ALUs), be a multi-core processor, or include one or more processors 806. Although this disclosure describes and illustrates a particular processor, this disclosure contemplates any suitable processor.

In particular embodiments, the memory 804 includes main memory for storing instructions for the processor 806 to execute or data for processor 806 to operate on. As an example, and not by way of limitation, computer system 800 may load instructions from storage 808 or another source (such as another computer system 800) to the memory 804. The processor 806 may then load the instructions from the memory 804 to an internal register or internal cache. To execute the instructions, the processor 806 may retrieve the instructions from the internal register or internal cache and decode them. During or after execution of the instructions, the processor 806 may write one or more results (which may be intermediate or final results) to the internal register or internal cache. The processor 806 may then write one or more of those results to the memory 804. In particular embodiments, the processor 806 executes only instructions in one or more internal registers or internal caches or in memory 804 (as opposed to storage 808 or elsewhere) and operates only on data in one or more internal registers or internal caches or in memory 804 (as opposed to storage 808 or elsewhere). One or more memory buses (which may each include an address bus and a data bus) may couple the processor 806 to the memory 804. The bus may include one or more memory buses, as described in further detail below. In particular embodiments, one or more memory management units (MMUs) reside between the processor 806 and memory 804 and facilitate accesses to the memory 804 requested by the processor 806. In particular embodiments, the memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory implementations, this disclosure contemplates any suitable memory implementation.

In particular embodiments, the storage 808 includes mass storage for data or instructions. As an example and not by way of limitation, the storage 808 may include a hard disk drive (HDD), a floppy disk drive, flash memory, an optical disc, a magneto-optical disc, magnetic tape, or a Universal Serial Bus (USB) drive or a combination of two or more of these. The storage 808 may include removable or non-removable (or fixed) media, where appropriate. The storage 808 may be internal or external to computer system 800, where appropriate. In particular embodiments, the storage 808 is non-volatile, solid-state memory. In particular embodiments, the storage 808 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 808 taking any suitable physical form. The storage 808 may include one or more storage control units facilitating communication between processor 806 and storage 808, where appropriate. Where appropriate, the storage 808 may include one or more storages 808. Although this disclosure describes and illustrates particular storage, this disclosure contemplates any suitable storage.

In particular embodiments, the I/O Interface 810 includes hardware, software, or both, providing one or more interfaces for communication between computer system 800 and one or more I/O devices. The computer system 800 may include one or more of these I/O devices, where appropriate. One or more of these I/O devices may enable communication between a person (i.e., a user) and computer system 800. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 810 may include one or more device or software drivers enabling processor 806 to drive one or more of these I/O devices. The I/O interface 810 may include one or more I/O interfaces 810, where appropriate. Although this disclosure describes and illustrates a particular I/O interface, this disclosure contemplates any suitable I/O interface or combination of I/O interfaces.

In particular embodiments, communication interface 812 includes hardware, software, or both providing one or more interfaces for communication (such as, for example, packet-based communication) between computer system 800 and one or more other computer systems 800 or one or more networks 814. As an example and not by way of limitation, communication interface 812 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 814 and any suitable communication interface 812 for the network 814. As an example and not by way of limitation, the network 814 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 812 for any of these networks, where appropriate. Communication interface 812 may include one or more communication interfaces 812, where appropriate. Although this disclosure describes and illustrates a particular communication interface implementation, this disclosure contemplates any suitable communication interface implementation.

The computer system 802 may also include a bus. The bus may include hardware, software, or both and may communicatively couple the components of the computer system 800 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Aspects of the present disclosure may be performed by entities and systems configured to provide transportation.

For example, transportation providers may implement one or more of the above-described systems and methods. Transportation providers may include transportation networking companies (TNCs). TNCs may implement a transportation matching system that matches transportation requests with a dynamic transportation network of vehicles. In certain instances, the vehicles may include road-going vehicles and/or personal mobility vehicles. In some examples, some of the vehicles may be standard commercially available vehicles and some of the vehicles may be owned and/or operated by individuals. In some implementations, the vehicles may additionally or alternatively be autonomous (or partly autonomous). Accordingly, throughout the instant disclosure, references to a "vehicle operator" (or an "operator") may, where appropriate, refer to a human driving a vehicle, an autonomous vehicle control system, an autonomous vehicle, an owner of an autonomous vehicle, an operator of an autonomous vehicle, an attendant of an autonomous vehicle, a requesting user piloting a vehicle, and/or an autonomous system for piloting a vehicle. In one example, the TNC may implement multiple transportation systems, where each transportation system is responsible for coordinating transportation matching for a specific geographic region or set quantity of vehicles.

The transportation system may communicate with computing devices associated with the vehicles in the network, which may be separate computing devices and/or may be computing devices that are integrated into the respective vehicles. In some examples, one or more of the computing devices may be mobile devices, such as a smart phone. Additionally or alternatively, one or more of the computing devices may be tablet computers, personal digital assistants, or any other type or form of mobile computing device. Additionally, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or an operator for a transportation matching application, a navigation application, and/or any other application suited for use by requestors and/or operators). Additionally or alternatively, one or more of the computing devices may be devices suitable for installing in a vehicle and/or may be a vehicle's computer that has a transportation management system application installed on the computer to provide transportation services to transportation requestors and/or communicate with the transportation system.

Figure 9:
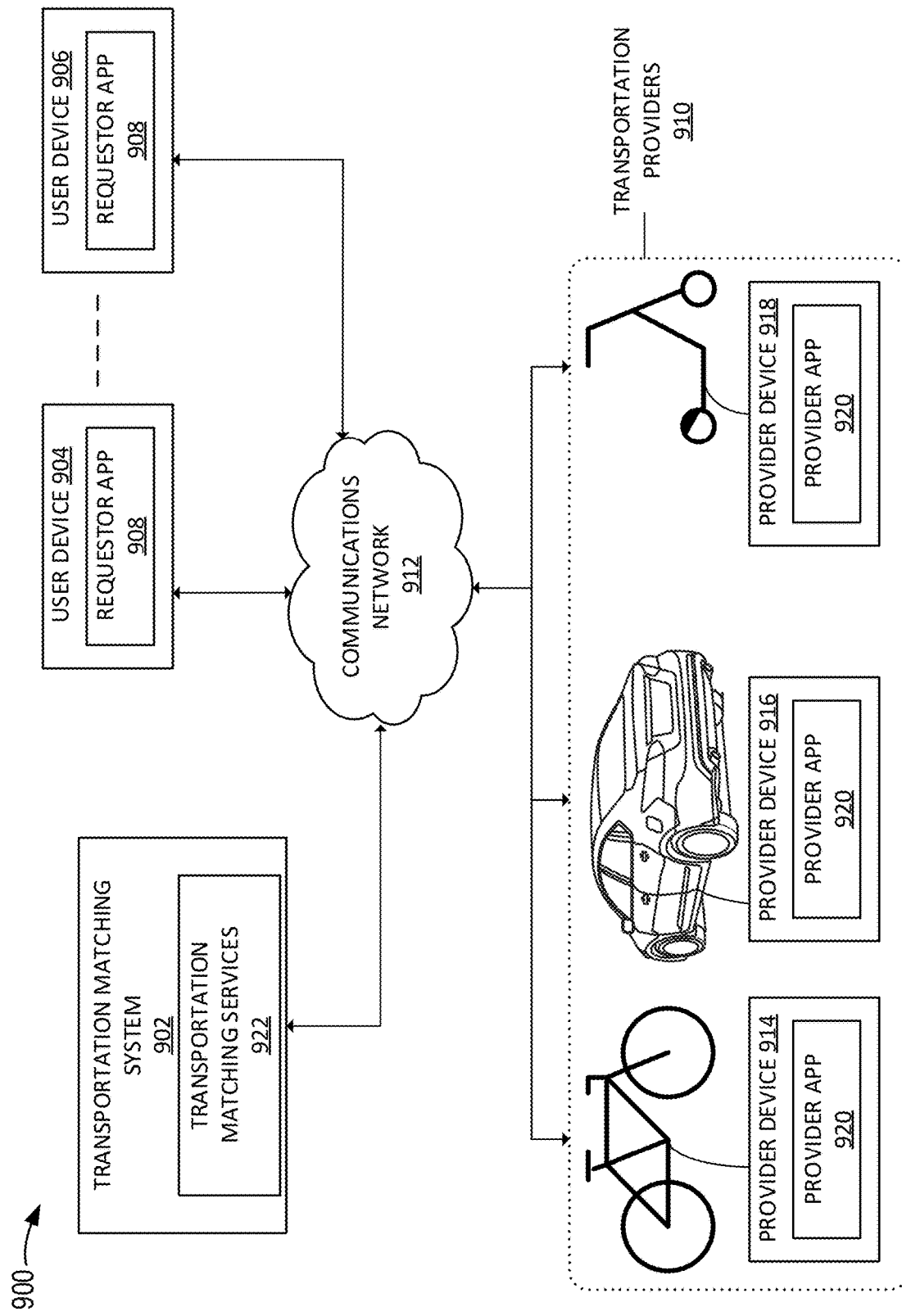
FIG. 9 illustrates a system according to an exemplary embodiment of the present disclosure.

FIG. 9 illustrates an example system 900 for matching transportation requests to a network of transportation vehicles according to one embodiment of the present disclosure. As illustrated, a transportation matching system 902 may communicate with user devices 904-906 requesting transportation. In some examples, the user devices 904-906 requesting transportation may include a requestor app 908 implemented by the transportation provider. The requestor app 908 may represent any application, program, and/or module that may provide one or more services related to requesting transportation services. For example, the requestor app 908 may include a transportation matching application for requestors. In some examples, the requestor app may match the user of the requestor app 908 (e.g., a transportation requestor) with transportation providers 910 through communication with the transportation matching system 902 via the communications network 912. In addition, the requestor app 908 may provide the transportation matching system 902 with information about a requestor (including, e.g., the current location of the requestor) to enable the transportation matching system 902 to provide dynamic transportation matching services for the requestor and one or more transportation providers 910, each of which may include a provider device 914, 916, 918. Each provider device may include a provider app 920, which may be any application program and/or set of instructions that may provide one or more services related to operating a vehicle and/or providing transportation matching services in conjunction with the transportation matching system 902 and the requestor app 908.

In some examples, the requestor app 908 may coordinate communications and/or a payment between a requestor and a transportation provider 910. According to some embodiments, the requestor app 908 may provide a map service, a navigation service, a traffic notification service, and/or a geolocation service. The provider app 920 may provide similar functions. In other implementations, the requestor app 908 may allow users to request access to certain vehicles, such as personal mobility vehicles (e.g., bicycles and/or scooters).

The transportation matching system 902 may arrange transportation on an on-demand and/or ad-hoc basis by, e.g., matching one or more transportation requestors with one or more transportation providers 910. For example, the transportation matching system 902 may provide one or more transportation matching services 922 for a networked transportation service, a ridesourcing service, a taxicab service, a car-booking service, an autonomous vehicle service, a personal mobility vehicle service, or some combination and/or derivative thereof. The transportation matching system 902 may include and/or interface with any of a variety of subsystems that may implement, support, and/or improve the transportation matching services 922. For example, the transportation matching services 922 may include or otherwise interface with a matching system (e.g., that matches requestors to ride opportunities and/or that arranges for requestors and/or providers to meet), a mapping system, a routing system (e.g., to help a provider reach a requestor, to help a requestor reach a provider, and/or to help a provider reach a destination), a rating system (e.g., to rate and/or gauge the reliability of a requestor and/or a provider), a payment system, and/or an autonomous or semi-autonomous driving system. The transportation matching system 902 may be implemented on various platforms, including a requestor-owned mobile device, a computing system installed in a vehicle, a server computer system, or any other hardware platform capable of providing transportation matching services to one or more requestors and/or providers.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both,"

unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A system comprising:
   a server; and
   at least one memory device storing instructions which, when executed by the server, cause the server to:
   receive, from a requestor computing device associated with a requestor, a transportation request;
   determine a transportation route for the transportation request comprising at least a first segment associated with a first modality and a second segment associated with a second modality;
   provide, for display via a user interface of the requestor computing device, a first interface associated with the first modality;
   select one or more user interface transition trigger events associated with the first modality and the second modality for the requestor computing device, the one or more user interface transition trigger events comprising a cellular connectivity change;
   monitor the requestor computing device for the one or more user interface transition trigger events;
   detect a user interface transition trigger event of the one or more user interface transition trigger events by identifying a change in cellular connectivity of the requestor computing device; and
   in response to detecting the user interface transition trigger event comprising the change in cellular connectivity, trigger the requestor computing device to change from the first interface associated with the first modality to a second interface associated with the second modality.

2. The system of claim 1, wherein the first interface displays first guidance information associated with the first modality and the second interface displays second guidance information associated with the second modality, wherein the first guidance information differs at least in part from the second guidance information, and wherein a first computing device associated with the first modality corresponds to a first transit provider and a second computing device associated with the second modality corresponds to a second transit provider different than the first transit provider.

3. The system of claim 2, wherein the first modality is associated with a first zoom level that provides a first level of zoom detail and the second modality is associated with a second zoom level that provides a second level of zoom detail, and the user interface transition trigger event triggers the requestor computing device to change from the first interface at the first zoom level to the second interface at the second zoom level.

4. The system of claim 1, wherein the instructions, when executed by the server, further cause the server to:
   determine a predicted travel time based on similar rides of the first modality that were previously completed, wherein the predicted travel time comprises a transition time between the first modality and the second modality;
   display the predicted travel time in the first interface; and
   detect the user interface transition trigger event based on the predicted travel time.

5. The system of claim 4, wherein the instructions, when executed by the server, further cause the server to determine the transition time according to the first modality and the second modality.

6. The system of claim 4, wherein the instructions, when executed by the server, further cause the server to:
   determine that the second modality is a new modality for the requestor computing device; and
   include a buffer time in the transition time based on determining that the second modality is a new modality.

7. The system of claim 1, wherein the instructions, when executed by the server, further cause the server to:
   detect a fraud event corresponding to the first modality or the second modality; and
   display a notification comprising an alert of the fraud event in the first interface or the second interface.

8. The system of claim 1, wherein the user interface transition trigger event is determined at least in part based on information detected by one or more sensors of the requestor computing device, the one or more sensors of the requestor computing device comprising at least one of an accelerometer, a gyroscope, a cellular connectivity sensor, an altitude sensor, or a pressure sensor.

9. The system of claim 1, wherein the instructions, when executed by the server, further cause the server to:
   monitor a first computing device associated with the first modality and a second computing device associated with the second modality; and
   detect the user interface transition trigger event based on a transition signal transmitted from the first computing device associated with the first modality and the second computing device associated with the second modality.

10. A method comprising:
    receiving, at a server and from a requestor computing device associated with a requestor, a transportation request;
    determining a transportation route for the transportation request comprising at least a first segment associated with a first modality and a second segment associated with a second modality;
    providing, for display via a user interface of the requestor computing device, a first interface associated with the first modality;

selecting one or more user interface transition trigger events associated with the first modality and the second modality for the requestor computing device, the one or more user interface transition trigger events comprising a cellular connectivity change;

monitoring the requestor computing device for the one or more user interface transition trigger events;

detecting a user interface transition trigger event of the one or more user interface transition trigger events by identifying a change in cellular connectivity of the requestor computing device; and in response to detecting the user interface transition trigger event, triggering the requestor computing device to change from the first interface associated with the first modality to a second interface associated with the second modality.

11. The method of claim 10, wherein the first interface displays first guidance information associated with the first modality and the second interface displays second guidance information associated with the second modality, wherein the first guidance information differs at least in part from the second guidance information, and wherein a first computing device associated with the first modality corresponds to a first transit provider and a second computing device associated with the second modality corresponds to a second transit provider different than the first transit provider.

12. The method of claim 11, wherein the first interface is associated with a first zoom level that provides a first level of zoom detail and the user interface transition trigger event triggers the requestor computing device to change to the second interface that is associated with a second zoom level that provides a second level of zoom detail that is different from the first level of zoom detail.

13. The method of claim 10, further comprising:
determining a predicted travel time based on similar rides of the first modality that were previously completed, wherein the predicted travel time comprises a transition time between the first modality and the second modality;

displaying the predicted travel time in the first interface; and wherein detecting the user interface transition trigger event is based on the predicted travel time.

14. The method of claim 13, further comprising determining the transition time according to a difference between the first modality and the second modality.

15. The method of claim 13, further comprising including a buffer time in the transition time according to the first modality or the second modality.

16. The method of claim 10, further comprising:
detecting a fraud event corresponding to the first modality or the second modality; and displaying a notification comprising an alert of the fraud event in the first interface or the second interface.

17. The method of claim 10, wherein the user interface transition trigger event is determined at least in part based on information detected by one or more sensors of the requestor computing device, the one or more sensors of the requestor computing device comprising at least one of an accelerometer, a gyroscope, a cellular connectivity sensor, an altitude sensor, or a pressure sensor.

18. The method of claim 10, further comprising:
monitoring a first computing device associated with the first modality and a second computing device associated with the second modality; and detecting the user interface transition trigger event based on a transition signal transmitted from the first computing device associated with the first modality and the second computing device associated with the second modality.

19. A non-transitory, computer-readable medium storing instructions which, when executed by a processor, cause the processor to:
receive, at a server and from a requestor computing device associated with a requestor, a transportation request;

determine a transportation route for the transportation request comprising at least a first segment associated with a first modality and a second segment associated with a second modality;

provide, for display via a user interface of the requestor computing device, a first interface associated with the first modality;

select one or more user interface transition trigger events associated with the first modality and the second modality for the requestor computing device, the one or more user interface transition trigger events comprising a cellular connectivity change;

monitor the requestor computing device for the one or more user interface transition trigger events;

detect a user interface transition trigger event of the one or more user interface transition trigger events by identifying a change in cellular connectivity of the requestor computing device; and in response to detecting the user interface transition trigger event comprising the change in cellular connectivity, trigger the requestor computing device to change from the first interface associated with the first modality to a second interface associated with the second modality.

20. The non-transitory, computer-readable medium of claim 19, wherein the first interface is associated with a first zoom level that provides a first level of zoom detail and the user interface transition trigger event triggers the requestor computing device to change to the second interface that is associated with a second zoom level that provides a second level of zoom detail that is different from the first level of zoom detail.

* * * * *